United States Patent
Takahashi et al.

(10) Patent No.: US 6,877,910 B2
(45) Date of Patent: Apr. 12, 2005

(54) PLASTIC FERRULE

(75) Inventors: Eietsu Takahashi, Shinagawa (JP); Kazuo Nomura, Suzaka (JP); Susumu Yamamoto, Suzaka (JP); Hiroshi Matsumiya, Suzaka (JP); Osamu Daikuhara, Shinagawa (JP); Shinichiro Kawaguchi, Shinagawa (JP); Noboru Shimizu, Shinagawa (JP); Hideo Miyazawa, Shinagawa (JP); Koji Watanabe, Kawasaki (JP); Hirohiko Tsugane, Suzaka (JP); Naoki Ikemori, Suzaka (JP)

(73) Assignee: Fujitsu Component Limited, Tokyo (JP)

( * ) Notice: Subject to any disclaimer, the term of this patent is extended or adjusted under 35 U.S.C. 154(b) by 119 days.

(21) Appl. No.: 10/272,002

(22) Filed: Oct. 17, 2002

(65) Prior Publication Data
US 2003/0070257 A1 Apr. 17, 2003

(30) Foreign Application Priority Data
Oct. 17, 2001 (JP) .................................. 2001-319729
Feb. 20, 2002 (JP) .................................. 2002-043538

(51) Int. Cl.⁷ ................................................ G02B 6/36
(52) U.S. Cl. ............................ 385/84; 385/60; 385/66
(58) Field of Search .............................. 385/56, 60, 66, 385/78, 84

(56) References Cited

U.S. PATENT DOCUMENTS

| | | | | |
|---|---|---|---|---|
| 4,695,124 A | * | 9/1987 | Himono et al. ............... | 385/78 |
| 4,743,084 A | * | 5/1988 | Manning ...................... | 385/84 |
| 4,815,809 A | * | 3/1989 | Szostak ....................... | 385/84 |
| 5,295,213 A | * | 3/1994 | Ueda et al. .................. | 385/78 |
| 5,778,126 A | * | 7/1998 | Saitoh ......................... | 385/84 |
| 6,447,173 B1 | * | 9/2002 | Takada et al. ............... | 385/78 |
| 6,533,469 B1 | * | 3/2003 | Nakamura et al. ........... | 385/84 |

FOREIGN PATENT DOCUMENTS

| | | |
|---|---|---|
| JP | 4-109204 | 4/1992 |
| JP | 2000-121872 | 4/2000 |
| JP | 2000-147320 | 5/2000 |

* cited by examiner

*Primary Examiner*—Mark Tremblay
(74) *Attorney, Agent, or Firm*—Staas & Halsey LLP

(57) ABSTRACT

A plastic ferrule including a centering section having a tubular body. The tubular body is provided with an outer-circumferential centering reference surface and a center axis of the centering reference surface. The centering section includes a resinous outer tube part having the outer-circumferential centering reference surface and provided, along the center axis, with a coated-fiber holding bore for securely accommodating a coated optical fiber and a fixing bore extending from the coated-fiber holding bore, the outer tube part forming a tubular wall with a generally uniform thickness as a whole. The centering section also includes an inner tube part fixed to the fixing bore of the outer tube part and provided along the center axis with an uncoated-fiber holding bore, communicating with the coated-fiber holding bore, for securely accommodating an uncoated optical fiber.

16 Claims, 28 Drawing Sheets

PLASTIC FERRULE

BACKGROUND OF THE INVENTION

1. Field of the Invention

The present invention relates to a plastic ferrule capable of being used in an optical connector. The present invention further relates to a method of manufacturing a plastic ferrule, and also to a mold capable of being used in the manufacturing method.

2. Description of the Related Art

In recent years, in the field of optical connectors, a plastic ferrule has been developed, which is integrally molded in one piece from a resinous material, in view of promoting mass production and cost reduction. Conventionally, a plastic ferrule is comprised of a cylindrical centering section which has an uncoated optical fiber exposing port at one axial end face thereof, and a flange section projecting radially outward adjacent to the proximal end of the centering section. The centering section is provided, along its center axis, with an uncoated-fiber holding bore which opens to the fiber exposing port for securely accommodating an uncoated optical fiber having a coating removed, and a coated-fiber holding bore for securely accommodating a coated optical fiber with a coating, which has a diameter larger than the uncoated-fiber holding bore and communicates with the uncoated-fiber holding bore in axial direction. The flange section is formed integrally with the centering section as a unitary body for receiving a biasing force applied in an axially forward direction by a spring in the optical connector.

Usually, an optical connector includes a cylindrical positioning member (called, e.g., a split sleeve), and is constructed to concentrically connect a pair of optical fibers with each other, by axially aligning centering sections of a pair of ferrules, respectively fitted with optical fibers, with each other in one split sleeve, and by abutting the end faces of the centering sections to each other under the biasing force of a spring. In this condition, the split sleeve is expanded by the centering sections of the ferrules and exerts an elastic restoring force, thereby centering and holding both ferrules in a predetermined position under the restoring force. Therefore, the cylindrical outer circumferential surface of the centering section of the ferrule serves as a centering reference surface for the uncoated optical fiber accommodated in the uncoated-fiber holding bore.

The above-described plastic ferrule is fabricated integrally in one unit via an injection molding process or a transfer molding process from resinous material having excellent moldability. With this process, however, there has been conventionally a problem as to how to improve dimensional precision and mechanical strength of a molded product up to a level at which there is no practical problem. In particular, it is required to improve dimensional precision of a ferrule, especially of the centering section thereof (such as an outer-diametral dimensional tolerance, cylindricity, circularity, eccentricity of an uncoated-fiber holding bore relative to an outer-circumferential centering reference surface, etc.), in order to reduce relative eccentricity of the uncoated-fiber holding bores of the centering sections of a pair of ferrules, which are abutted together in the split sleeve, during a connecting process by using the optical connector. In an optical connector used for connection of a single mode optical fiber, for example, extremely high dimensional precision in the order of 0.1 to 1 $\mu$m is required for various dimensions of the centering section of the ferrule.

However, in the construction of a conventional plastic ferrule, the thickness of a cylindrical wall of the centering section changes unavoidably from the uncoated-fiber holding bore of a small diameter to the coated-fiber holding bore of a larger diameter. This wall thickness change may cause unbalanced mold shrinkage of resinous material of the ferrule. As a result, in the conventional ferrule, it has been a concern that above-described various dimensional precision, required for the centering section, tends to deteriorate. This deterioration in dimensional precision may result in an increase in relative eccentricity to the counterpart ferrule supported in the split sleeve.

Also, in the conventional plastic ferrule, when the centering section of the counterpart ferrule, abutted in the split sleeve of an optical connector, is made of a hard material such as ceramic, a pressing force (usually in the order of several Newton) exerted upon respective distal end faces of the centering sections of both ferrules during connection may deform the end face of resinous centering section into a concave profile. If this state continues for a long period, it is a concern that plastic deformation (or creep) may take place in the end face of the resinous centering section, which may result in increased optical connection loss of the connector.

SUMMARY OF THE INVENTION

It is therefore an object of the present invention to provide a plastic ferrule usable in an optical connector, wherein molding dimensional precision in high level can be attained relatively easily in the various mold dimensions of a centering section of the ferrule, and relative eccentricity to a counterpart ferrule, connected in a split sleeve, can be reduced as much as possible.

It is another object of the present invention to provide a plastic ferrule usable in an optical connector, wherein, even when a centering section of a counterpart ferrule is made of a hard material, plastic deformation of the end face of a centering section during connection can be avoided, and optical connection loss can be reduced.

It is still another object of the present invention to provide a method for manufacturing a plastic ferrule usable in an optical connector, wherein a centering section of the ferrule can be molded in high dimensional precision.

It is a further object of the present invention to provide a mold usable in such a manufacturing method.

According to the present invention, there is provided a plastic ferrule comprising a centering section having a tubular body with an outer-circumferential centering reference surface and a center axis of the centering reference surface; the centering section comprising a resinous outer tube part having the outer-circumferential centering reference surface and provided, along the center axis, with a coated-fiber holding bore for securely accommodating a coated optical fiber and a fixing bore extending from the coated-fiber holding bore, the outer tube part forming a tubular wall with a generally uniform thickness as a whole; and an inner tube part fixed to the fixing bore of the outer tube part and provided along the center axis with an uncoated-fiber holding bore, communicating with the coated-fiber holding bore, for securely accommodating an uncoated optical fiber.

In this plastic ferrule, the inner tube part may be formed from a material having hardness higher than the hardness of the outer tube part.

Alternatively, the inner tube part may be formed from a resinous material identical to the outer tube part.

The inner tube part may include an axial end face facing away from the coated-fiber holding bore of the outer tube part and exposed outside of the fixing bore of the outer tube part.

In this arrangement, the axial end face of the inner tube part may have a spherically curved profile and may be located at a position projecting outward from the fixing bore of the outer tube part.

The outer tube part may include an engaging portion engaged with the inner tube part to prevent the inner tube part from being axially moved in the fixing bore.

In this arrangement, the engaging portion may include a protrusion provided in the coated-fiber holding bore, and the inner tube part may be abutted to the protrusion at an axial end face facing toward the coated-fiber holding bore.

The fixing bore of the outer tube part may include a cylindrical inner-circumferential surface, and the inner tube part may include a cylindrical outer-circumferential surface in closely contact with the inner-circumferential surface of the fixing bore.

The present invention also provides a method for producing a plastic ferrule, the plastic ferrule being as set forth in claim 8, the method comprising providing the inner tube part and the outer tube part as separate members independent from each other; fitting the inner tube part into the fixing bore of the outer tube part; rotating the inner tube part about the center axis in a condition where the outer-circumferential surface of the inner tube part is in close contact with the inner-circumferential surface of the outer tube part, and thereby adjusting relative positional deviation between the center axis of the outer-circumferential centering reference surface and the uncoated-fiber holding bore; and fixing the inner tube part to the outer tube part at an angular position at which relative positional deviation is minimized.

The present invention also provides a plastic ferrule comprising a centering section having a tubular body with an outer-circumferential centering reference surface and a center axis of the centering reference surface, the centering section being provided along the center axis with an uncoated-fiber holding bore for securely accommodating an uncoated optical fiber; wherein an axial length L1 (mm) of the uncoated-fiber holding bore and an axial effective length L2 (mm) of the centering section are selected to satisfy the formula L1=L2+α, in which 0.5 (mm)≦α≦3.0 (mm).

In this plastic ferrule, the centering section may comprise a resinous outer tube part having the outer-circumferential centering reference surface and provided, along the center axis, with a first bore portion defining a major length of the uncoated-fiber holding bore and a fixing bore extending from the first bore portion in a radially expanding profile to open at an axial end face of the centering section; and an inner tube part provided along the center axis with a second bore portion defining a remaining length of the uncoated-fiber holding bore, the inner tube part being fixed to the fixing bore of the outer tube part in a condition where the second bore portion is linearly aligned with the first bore portion of the outer tube part.

In this arrangement, the inner tube part is formed from a material having a hardness higher than the hardness of the outer tube part.

Also, the inner tube part may include an axial end face facing away from the first bore portion of the outer tube part and located at a position projecting outward from the fixing bore of the outer tube part.

In this arrangement, the axial end face of the inner tube part may have a spherically curved profile.

The present invention also provides a method for producing a plastic ferrule, the plastic ferrule being as set forth in claim 11, the method comprising providing the inner tube part and the outer tube part as separate members independent from each other; providing a guide pin having an outer diameter slightly smaller than an inner diameter of the uncoated-fiber holding bore; inserting the guide pin into the first bore portion of the outer tube part to dispose a certain length of the guide pin inside the fixing bore; fitting the inner tube part into the fixing bore of the outer tube part, while receiving the certain length of the guide pin, disposed inside the fixing bore, into the second bore portion of the inner tube part; and fixing the inner tube part to the fixing bore of the outer tube part and removing the guide pin from the uncoated-fiber holding bore.

The present invention also provides a method for producing a plastic ferrule, the plastic ferrule comprising a tubular centering section having an outer-circumferential centering reference surface and a center axis thereof; the centering section being provided, along the center axis, with an uncoated-fiber holding bore for securely accommodating an uncoated optical fiber and a coated-fiber holding bore, communicating with the uncoated-fiber holding bore, for securely accommodating a coated optical fiber; the method comprising providing a mold including a first cavity for molding an inner tube part, the inner tube part including the uncoated-fiber holding bore and an outer circumferential surface presenting a cross-sectional profile generally identical to a cross-sectional profile of the coated-fiber holding bore, and a second cavity for molding an outer tube part, the outer tube part including the outer-circumferential centering reference surface and the coated-fiber holding bore; molding the inner tube part in the first cavity of the mold from a molten resinous material; taking the inner tube part, as molded, from the first cavity and locating the inner tube part in the second cavity of the mold; and supplying a molten resinous material around the outer circumferential surface of the inner tube part and molding the outer tube part in the second cavity.

In this method, the step of providing the mold may include further providing a tubular core for forming the coated-fiber holding bore of the outer tube part, the tubular core capable of being alternately arranged in the first cavity and the second cavity in an immovable manner, and a core pin for forming the uncoated-fiber holding bore of the inner tube part, the core pin capable of being alternately arranged in the first cavity and the second cavity in an axially movable manner relative to the tubular core; the step of molding the inner tube part may include engaging the core pin with a wall defining the first cavity to securely retain the core pin in the first cavity; the step of locating the inner tube part in the second cavity may include maintaining a condition where the tubular core and the core pin carry the inner tube part; and the step of molding the outer tube part may include axially moving the core pin relative to the tubular core to partially open the uncoated-fiber holding bore of the inner tube part, and engaging the uncoated-fiber holding bore, as partially opened, with a wall defining the second cavity to securely retain the inner tube part in the second cavity.

The present invention also provides a mold for producing a plastic ferrule, the plastic ferrule comprising a tubular centering section having an outer-circumferential centering reference surface and a center axis thereof; the centering section being provided, along the center axis, with an uncoated-fiber holding bore for securely accommodating an uncoated optical fiber and a coated-fiber holding bore, communicating with the uncoated-fiber holding bore, for securely accommodating a coated optical fiber; the mold comprising a first fixed mold; a second fixed mold having a structure different from the first fixed mold; and a movable mold arranged in a movable manner relative to the first fixed mold and the second fixed mold and capable of being alternately assembled with the first fixed mold and the second fixed mold; wherein the movable mold cooperates with the first fixed mold to define a first cavity for molding an inner tube part, the inner tube part including the uncoated-fiber holding bore and an outer circumferential surface presenting a cross-sectional profile generally identical to a cross-sectional profile of the coated-fiber holding bore, and cooperates with the second fixed mold to define a second cavity for molding an outer tube part around the inner tube part, as molded in the first cavity, in a condition where the inner tube part is located in the second cavity, the outer tube part including the outer-circumferential centering reference surface and the coated-fiber holding bore.

In this mold, the movable mold may comprise a tubular core for forming the coated-fiber holding bore of the outer tube part, the tubular core capable of being alternately arranged in the first cavity and the second cavity in an immovable manner, and a core pin for forming the uncoated-fiber holding bore of the inner tube part, the core pin capable of being alternately arranged in the first cavity and the second cavity in an axially movable manner relative to the tubular core; the first fixed mold may be provided on a wall defining the first cavity with a groove capable of being engaged with the core pin to securely retain the core pin in the first cavity during a molding of the inner tube part; the core pin may axially move relative to the tubular core to partially open the uncoated-fiber holding bore of the inner tube part during a molding of the outer tube part in the second cavity; and the second movable mold may be provided on a wall defining the second cavity with a projection capable of being engaged with the uncoated-fiber holding bore of the inner tube part to securely retain the inner tube part in the second cavity during a molding of the outer tube part.

The movable mold may comprise a pair of movable molds having mutually identical structures, the movable molds capable of being simultaneously assembled respectively with the first fixed mold and the second fixed mold, to mold the inner tube part in the first cavity and to mold, in a generally simultaneous manner, the outer tube part in the second cavity around another inner tube part, as previously molded in the first cavity, located in the second cavity.

BRIEF DESCRIPTION OF THE DRAWINGS

The above and other objects, features and advantages of the present invention will become more apparent from the following description of preferred embodiments in connection with the accompanying drawings, in which.

DESCRIPTION OF THE PREFERRED EMBODIMENT

Figure 1:
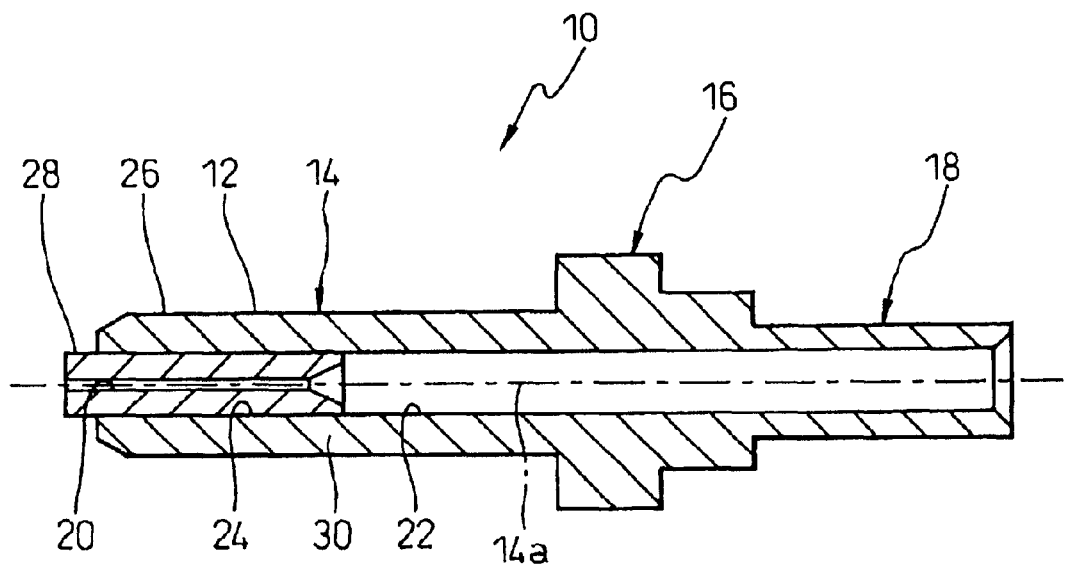
FIG. 1 shows a first embodiment of a plastic ferrule according to the present invention, in a sectional view taken along a line I—I of FIG. 3B.
Figure 2A:
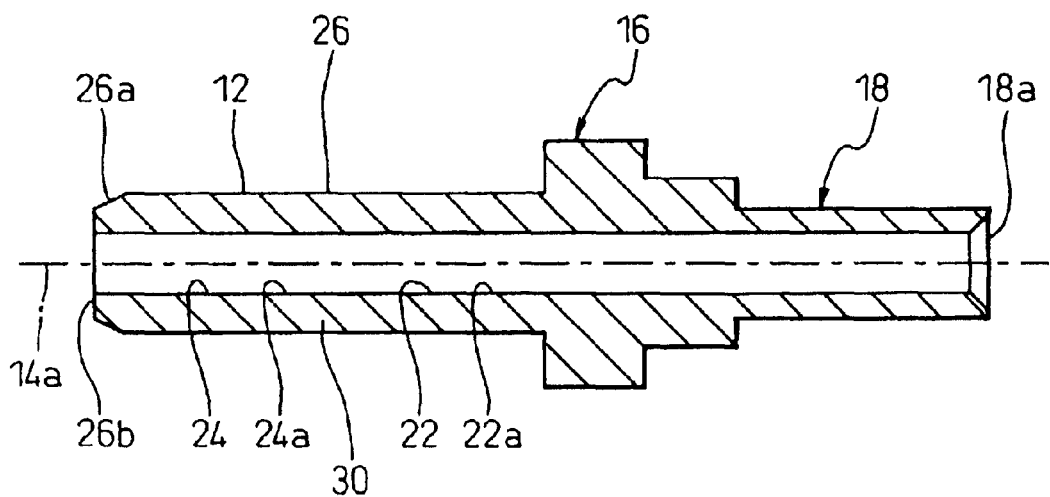
FIG. 2A is a sectional view of an integrally molded portion, including an outer tube part, of the ferrule shown in FIG. 1.
Figure 2B:
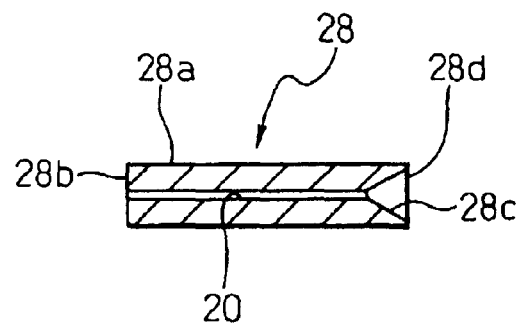
FIG. 2B is a sectional view of an inner tube part of the ferrule.
Figure 3A:
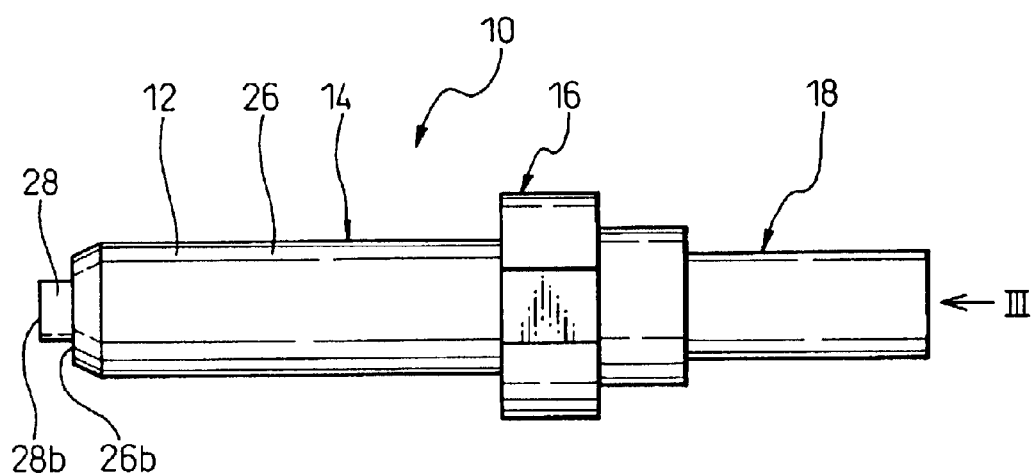
FIG. 3A is a front view of the ferrule shown in FIG. 1.
Figure 3B:
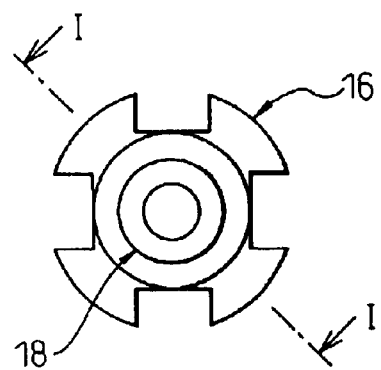
FIG. 3B is a side view of the ferrule as seen from an arrow III.
Figure 4:
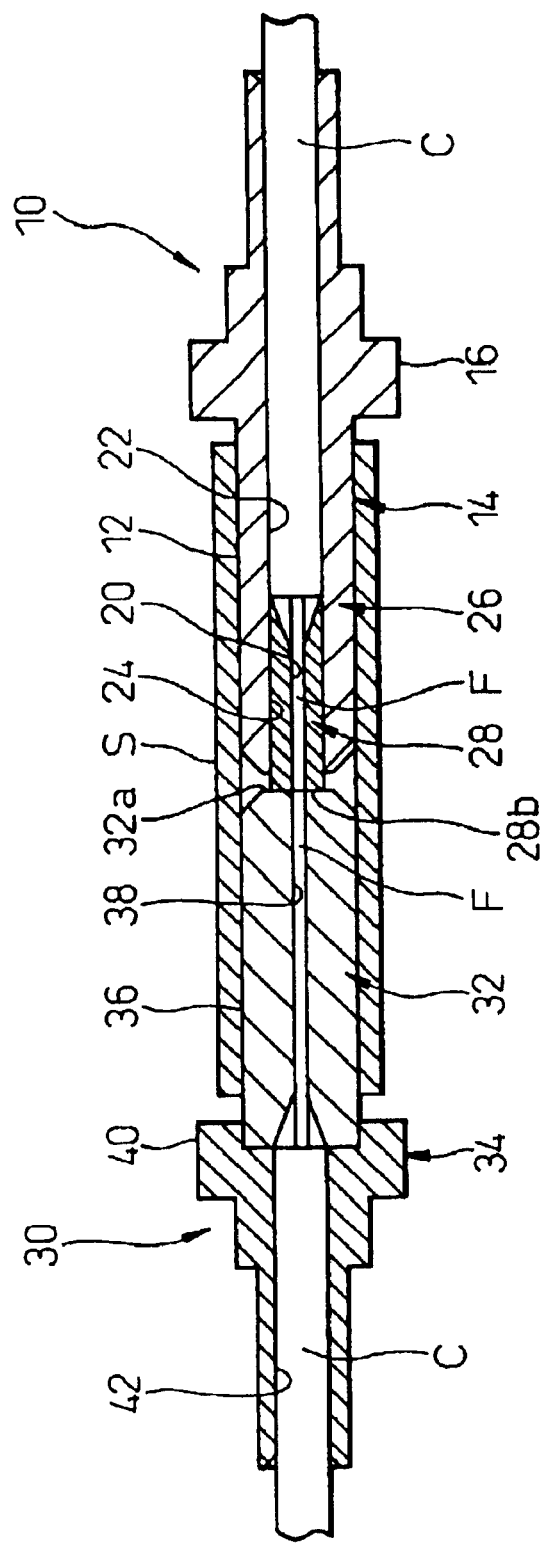
FIG. 4 shows, in a sectional view, a condition where the ferrule of FIG. 1 is connected to a conventional ferrule.
Figure 5:
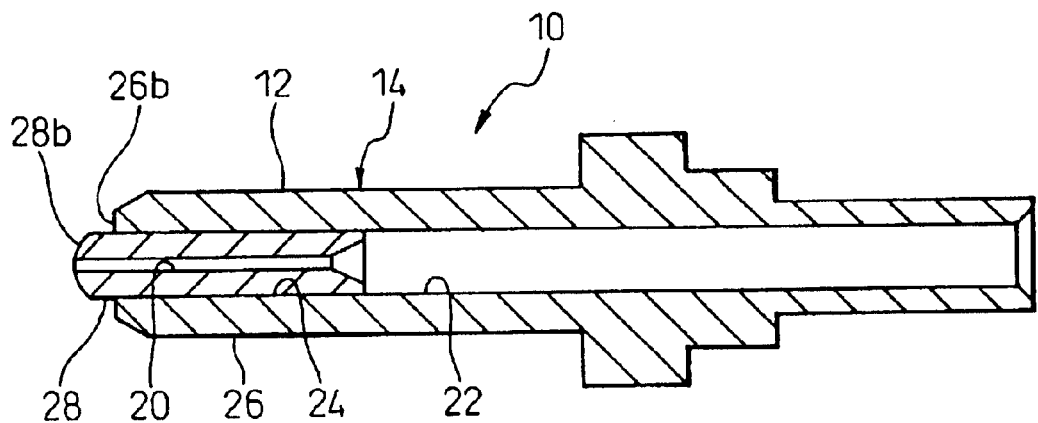
FIG. 5 is a sectional view of a modification of the ferrule.
Figure 6:
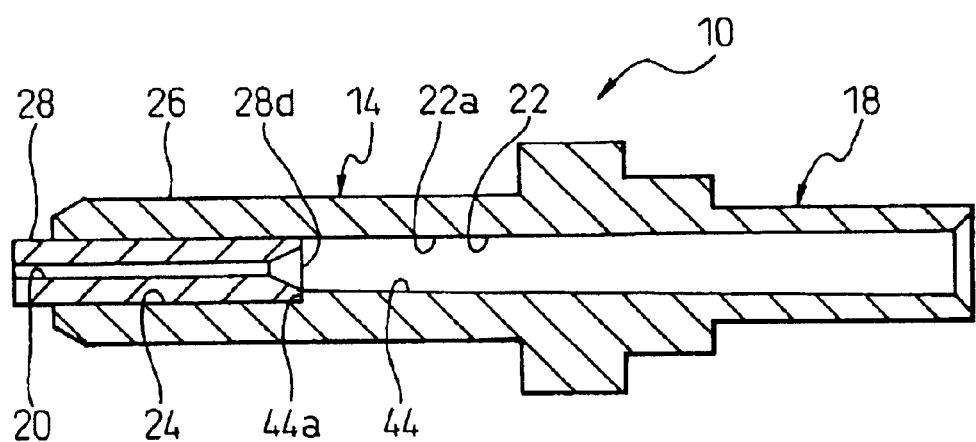
FIG. 6 is a sectional view of another modification of the ferrule.

Referring now to the drawings, in which the same or similar components are denoted by common reference numerals, FIGS. 1 to 3 show a plastic ferrule 10, according to the first embodiment of the present invention, FIG. 4 shows a connected condition of optical fibers in which the ferrule 10 is used, and FIGS. 5 and 6 respectively show modifications of the ferrule 10.

The ferrule 10 includes a hollow tubular centering section 14 having a cylindrical outer circumferential surface 12, a flange section 16 provided adjacent to one axial end (or a proximal end) of the centering section 14 so as to project radially outwards, and a guide section 18 extending opposite to and concentric with the centering section 14 from the flange section 16. The centering section 14 is provided, along a center axis 14a thereof (that is, the center axis of the cylindrical outer circumferential surface 12), with a first, uncoated-fiber holding bore 20 for securely accommodating an uncoated optical fiber with no coating, and a second, coated-fiber holding bore 22 having a diameter larger than the uncoated-fiber holding bore, for securely accommodating a coated optical fiber with a coating, the first and second bores 20, 22 being in communication with each other in the axial direction.

The outer circumferential surface 12 of the centering section 14 serves as a centering reference surface for the uncoated optical fiber accommodated in the uncoated-fiber holding bore 20 during the connecting operation of optical fibers as described later. The outer-circumferential centering reference surface 12 extends linearly with a uniform outer diameter, from a portion in the vicinity of another axial end (or a distal end) of the centering section 14 to the proximal end of the centering section 14 adjacent to the flange section 16. The flange section 16 is integrally joined to the centering section 14 to form a unitary body, and serves as a part for receiving a biasing force in an axial forward direction from a spring provided in an optical connector as described later. The guide section 18 is also integrally joined to the centering section 14 and the flange section 16 to form a unitary body, and serves as a part for holding the objective coated optical fiber in a straight form near the connecting end thereof and for ensuring an application area for an adhesive.

The centering section 14 of the ferrule 10 includes an outer tube part 26 having the outer-circumferential centering reference surface 12 and provided, along the center axis 14a, with the coated-fiber holding bore 22 and a third, fixing bore 24 extending from the coated-fiber holding bore 22 toward the distal end of the centering section, and an inner tube part 28 provided with the uncoated-fiber holding bore 20 and received by the fixing bore 24 of the outer tube part 26 to be fixed therein. In the illustrated example, the outer tube part 26 and the inner tube part 28 are formed, as mutually independent parts, individually from materials having different hardness.

As shown in FIG. 2A, the coated-fiber holding bore 22 and fixing bore 24 of the outer tube part 26 include inner circumferential surfaces 22a and 24a, respectively, linearly connected to each other with no step difference therebetween, while the center axis 14a is defined as the substantial centerlines of both surfaces, each surface having a uniform diametrical dimension. The outer-circumferential centering reference surface 12 is joined at the distal end portion of the outer tube part 26 via an annular tapered surface 26a to a generally flat distal end face 26b, and the fixing bore 24 opens in the distal end face 26b. Thus, in the outer tube part 26, a tubular wall 30 having a generally uniform thickness as a whole is formed between the outer-circumferential centering reference surface 12 and the inner circumferential surfaces 22a, 24a. The coated-fiber holding bore 22 linearly extends while maintaining the uniform inner diametrical dimension through the flange section 16 and the guide section 18, and opens at an axial end face 18a of the guide section 18. The outer tube part 26 constructed in this manner is formed integrally with the flange section 16 and the guide section 18 into a unitary body from a desired resinous material, such as a liquid crystal polymer, by, e.g., an injection molding process.

As shown in FIG. 2B, the inner tube part 28 has a cylindrical outer circumferential surface 28a capable of coming into close contact with the inner circumferential surface 24a of the fixing bore 24 of the outer tube part 26, and the uncoated-fiber holding bore 20 is formed in a position substantially centered or aligned to the center axis of the outer circumferential surface 28a. The uncoated-fiber holding bore 20 extends linearly with a uniform diametrical dimension, and opens at one axial end face 28b of the inner tube part 28 and opens via an annular tapered surface 28c gradually expanding in a radial direction at another axial end face 28d.

The inner tube part 28 having such construction is formed from a material such as metal, ceramics, etc., which is harder, and preferably has a larger elastic modulus, than the resinous material of the outer tube part 26. In particular, while considering a counterpart ferrule, prepared in a connecting process of optical fibers as described later, is formed of highly tough ceramic, such as zirconia ceramic generally used for a ferrule of an optical connector, it is advantageous that the material for the inner tube part 28 has mechanical properties (hardness, elastic modulus, toughness, etc.) at least comparable to zirconia ceramics.

The inner tube part 28 is fitted into the fixing bore 24 of the outer tube part 26 in an orientation wherein the axial end face 28d on the side of the annular tapered surface 28c is adjacent to the coated-fiber holding bore 22 of the outer tube part 26. In the illustrated embodiment, the inner tube part 28 is positioned in the fixing bore 24 in such a manner that the other axial end face 28b projects in a predetermined length from the distal end face 26b of the outer tube part 26 at which the fixing bore opens (FIG. 3A). Alternatively, the inner tube part 28 may be fitted into the outer tube part 28 in such a manner that the axial end face 28b is exposed in coplanar relation with the distal end face 26b. The inner tube part 28 is firmly fixed to the fixing bore 24 by pressing the inner tube part in an interference fit into the fixing bore or by using an adhesive.

The ferrule 10 thus constructed has an assembled structure of the centering section 14 having the outer-circumferential centering reference surface 12, which includes the resinous outer tube part 26 provided with the tubular wall 30 of a generally uniform thickness as a whole, and the inner tube part 28 provided with the uncoated-fiber holding bore 20 and made of a hard material. Therefore, when the outer tube part 26 is molded from a resinous material integrally with the flange section 16 and the guide section 18 into a unitary body, the mold shrinkage of the resinous material of, especially, the outer tube part 26 is generated in a balanced condition, which makes it possible for the centering section 14 to ensure a high dimensional precision (such as the dimensional tolerance of the outer diameter, cylindricity and circularity of the outer-circumferential centering reference surface 12, or eccentricity of the uncoated-fiber holding bore 20 of inner tube part 28 relative to the center axis 14a). Thus, the ferrule 10 can maintain the eccentricity of the uncoated-fiber holding bore 20 of the centering section 14 and the cylindricity and circularity of the outer-circumferential centering reference surface 12, which affect the connection loss of an optical fiber, at a high precision level of 0.1 to 1 μm order, applicable to a single mode optical fiber.

If the fixing bore 24 (or the coated-fiber holding bore 22) of the outer tube part 26 and the uncoated-fiber holding bore 20 of the inner tube part 28 have, respectively, a very slight eccentricity relative to the center axis, it is possible to minimize the eccentricity of the uncoated-fiber holding bore 20 by the following assembling procedure. That is, after the inner tube part 28 is fitted into the fixing bore 24 of the outer tube part 26 as already described, the inner tube part 28 is rotated about the center axis while the outer circumferential surface 28a of the inner tube part 28 being in close contact with the inner circumferential surface 24a of the fixing bore 24. In this way, the positional deviation of the uncoated-fiber holding bore 20 from the center axis 14a of the centering section 14 is adjusted. Then, at a rotational position where the positional deviation is minimized, the inner tube part 28 is fixed to the outer tube part 26. In this respect, the positional deviation of the uncoated-fiber holding bore 20 during the rotation of the inner tube part 28 can be determined in real time by using image pick-up means, such as a CCD camera, or other well-known optical means.

One example of an optical fiber connecting structure using the ferrule 10 having above construction will be explained with reference to FIG. 4. In this optical fiber connecting structure, the ferrule 10 is mounted on one of the optical fibers to be connected, and a conventional ceramics ferrule 30 is mounted on the other optical fiber. The ferrule 30 includes a tubular centering section 32 made of ceramics such as zirconia ceramics, and a metallic shell section 34 securely supporting the proxial end of the centering section 32. The centering section 32 is provided with a cylindrical outer-circumferential centering reference surface 36 and an uncoated-fiber holding bore 38, and the shell section 34 is provided with a flange section 40 and a coated-fiber holding bore 42.

A pair of coated optical fibers C, to which the ferrules 10, 30 are respectively attached, are prepared in a state where uncoated optical fibers F are exposed by removing resinous coatings on the predetermined lengths (about 3 to 5 mm order) of respective end regions. The exposed length of each uncoated optical fiber F is set to be somewhat longer than the length of the uncoated-fiber holding bore 20, 38 of the ferrule 10, 30. These coated optical fibers C are respectively inserted into the ferrule 10, 30 from the rear end thereof, so as to place the exposed uncoated optical fibers F in the uncoated-fiber holding bores 20, 38, and to place the regions near the connecting ends of the coated optical fibers C in the coated-fiber holding bore 22, 42. The coated optical fibers C are respectively fixed to the coated-fiber holding bore 22, 42 by using an adhesive (not shown). Then, the excess length of the uncoated optical fiber F, projecting outside of the uncoated-fiber holding bore 20, 38 of each ferrule 10, 30, is subjected to an end-face finishing process, such as a polishing or a heating, to complete the attaching operation of the ferrule.

A pair of coated optical fibers C, having the ferrules 10, 30 respectively attached thereto, are connected to each other in a split sleeve S mounted in an optical connector (not shown), in such a way as described below. The centering sections 14, 32 of the ferrules 10, 30 are arranged in predetermined positions in the split sleeve S with the respective outer circumferential surfaces 12, 36 thereof being in close contact with the cylindrical inner circumferential surface of the split sleeve S. The split sleeve S is expanded by the centering sections 14, 32 of the ferrules 10, 30 and exerts an elastic restoring force, so as to center and support each ferrule 10, 30 in a predetermined position under the restoring force. In this state, the biasing force of built-in springs provided in the optical connector acts on the ferrules 10, 30, so that the axial end face 28b of the inner tube part 28 of the ferrule 10 and the distal end face 32a of the centering section 32 of the ferrule 30 are abutted to each other. In this manner, the uncoated optical fibers F, securely held in the centering sections 14, 32 of the ferrules 10, 30, are concentrically aligned and connected with each other.

As already described, the outer circumferential surface 12 of the centering section 14 of the ferrule 10 is formed as a cylindrical surface having cylindricity and circularity at a very high level of precision and eccentricity of the uncoated-fiber holding bore 20 is substantially eliminated. Therefore, when a pair of ferrules 10, 30 are centered and supported in the split sleeve S as described above, the relative eccentricity between the centering sections 14, 32 of the ferrules 10, 30 (that is, positional deviation between the uncoated-fiber holding bores 20, 38) can be reduced to a certain degree wherein the connection loss of the optical fibers can be kept at a desired low level.

Also, in the ferrule 10, the inner tube part 28 of the centering section 14 is made of a hard material such as metal, ceramic, or the like. Therefore, during the connecting operation with the counterpart ferrule 30, even if a pressing force (usually in the order of several Newton) is imposed for a long period between the axial end face 28b of the inner tube part 28 and the distal end face 32a of the ceramic centering section 32, plastic deformation (or the creep) of the inner tube part 28 can be reliably avoided. As a result, the connection loss in the optical fiber connecting structure can be reduced.

In the above embodiment, it is advantageous to suitably spread an internal stress generating near the axial end face 28b of the inner tube part 28, during the period when the pressing force is loaded in the axial direction on the inner tube part 28 of the centering section 14 in the connecting condition with the counterpart ferrule 30, in order to reliably avoid plastic deformation of the inner tube part 28. FIG. 5 shows a modification of the ferrule 10, which includes the inner tube part 28 constructed for this purpose.

In the ferrule 10 according to the illustrated modification, the inner tube part 28 is formed such that the axial end face 28b projecting from the distal end face 26b of the outer tube part 26 has a spherically curved profile. Such a curved profile of the axial end face 28b serves to spread suitably the internal stress generated by the axial pressing force applied from the counterpart ferrule 30. In the ferrule 10, in particular, a desired curved profile can be given to the axial end face 28b of the inner tube part 28 by, e.g., a abrading process or the like, before the inner tube part 28 is assembled into the outer tube part 26.

Also, in the above embodiment, it is required to reliably fix and hold the inner tube part 28 in the fixing bore 24 of the outer tube part 26, during the period when the pressing force is acting in the axial direction on the inner tube part 28 of the centering section 14 in the connecting condition with the counterpart ferrule 30. In order to improve the reliability of this fixation, it is advantageous to provide on the outer tube part 26 of the ferrule 10 with an engaging portion for preventing the inner tube part 28 from being moved in an axial direction in the fixing bore 24. FIG. 6 shows another modification of the ferrule 10, which includes the outer tube part 28 constructed for this purpose.

In the ferrule 10 according to the illustrated modification, the outer tube part 26 has a protrusion 44, as the engaging portion, provided locally in the coated-fiber holding bore 22. The protrusion 44 is formed on the inner circumferential surface 22a of the coated-fiber holding bore 22 while a shoulder surface 44a extending perpendicular to the inner circumferential surface 22a is disposed at the boundary between the coated-fiber holding bore 22 and the fixing bore 24. The inner tube part 28 is located at a proper position in the fixing bore 24, in a condition where the axial end face 28d adjacent to the coated-fiber holding bore 22 is abutted to the shoulder surface 44a of the protrusion 44. The inner tube part 28 thereby resists the axial pressing force applied in a direction for urging it into the outer tube part 26, and is securely held at the predetermined position in the fixing bore 24. The protrusion 44 may be formed in a gradually rising shape from the guide section 18 of the ferrule 10 as illustrated, or may be formed to project only locally near the boundary of the coated-fiber holding bore 22 and the fixing bore 24. Also, one or more protrusions 44 may be formed at desired angular positions in the circumferential direction of the coated-fiber holding bore 22 at an equal interval or in a random arrangement.

Figure 7:
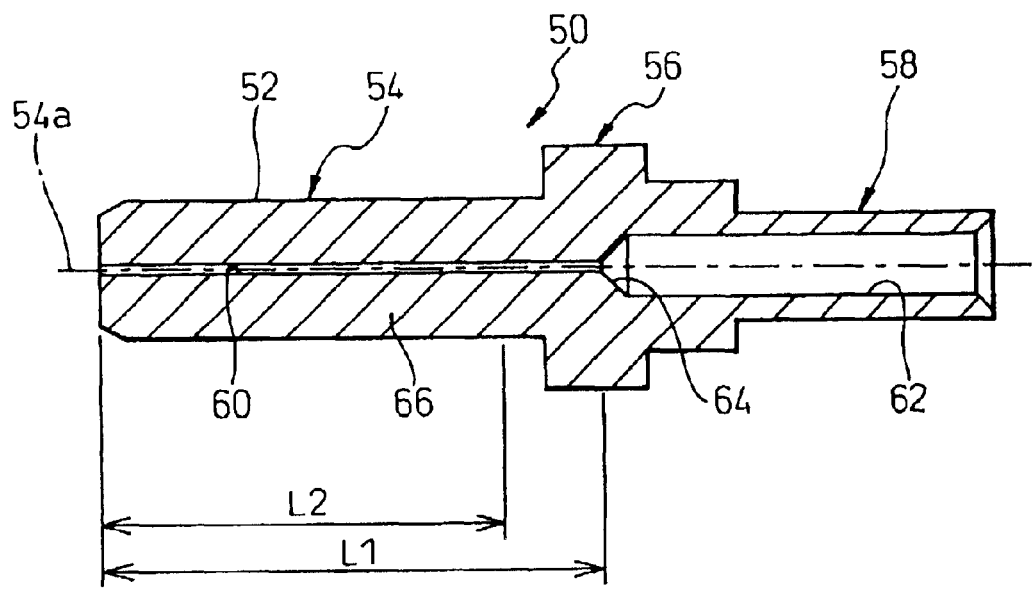
FIG. 7 is a sectional view of a plastic ferrule according to a second embodiment of the present invention.
Figure 8:
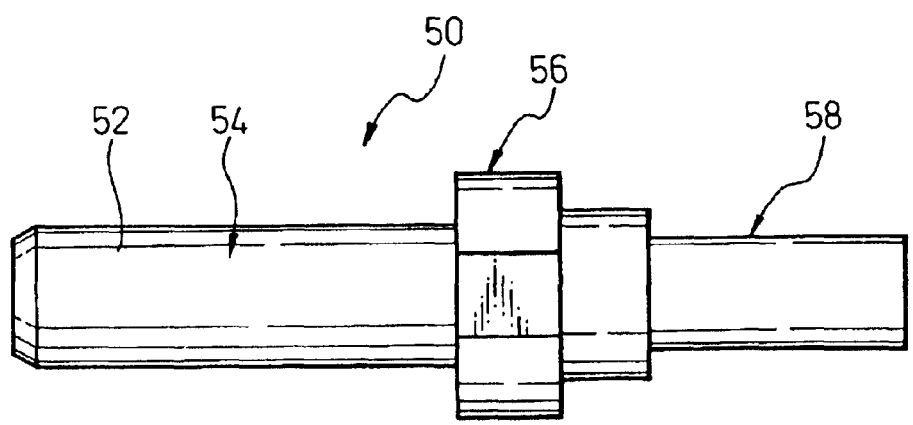
FIG. 8 is a front view of the ferrule shown in FIG. 7.

FIGS. 7 and 8 show a plastic ferrule 50 according to a second embodiment of the present invention. The ferrule 50 employs a measure, different from that in the ferrule 10, for relatively easily ensuring high dimensional precision for molding in the centering section.

The ferrule 50 includes a hollow tubular centering section 54 having a cylindrical outer circumferential surface 52, a flange section 56 provided adjacent to one axial end (or a proximal end) of the centering section 54 to project radially outwards, and a guide section 58 extending opposite to and concentric with the centering section 54 from the flange section 56. The centering section 54, the flange section 56 and the guide section 58 are integrally formed into a unitary body from desired resinous material such as liquid crystal polymer by, e.g., an injection molding process.

The centering section 54 is provided, along the center axis 54a thereof (that is, the center axis of the cylindrical outer circumferential surface 52), with an uncoated-fiber holding bore 60 for securely accommodating an uncoated optical fiber F having its coating removed (FIG. 4). In the guide section 58, a coated-fiber holding bore 62, having a larger diameter than the uncoated-fiber holding bore 60, is formed, for securely accommodating a coated optical fiber C with a coating (FIG. 4), concentrically on an extended line of the center axis 54a of the centering section 54 therewith. The uncoated-fiber holding bore 60 and the coated-fiber holding bore 62 are in axially straight communication with each other at the position corresponding to the flange section 56 via an annular tapered surface 64.

The outer circumferential surface 52 of the centering section 54 serves as a centering reference surface for the uncoated optical fiber F accommodated in the uncoated-fiber holding bore 60, at the time of the optical fiber connecting operation as described with reference to FIG. 4. The outer-circumferential centering reference surface 52 is formed to extend linearly with a uniform outer diametrical dimension from the vicinity of another axial end (or a distal end) of the centering section 54 to the proximal end of the latter adjacent to the flange section 56. As shown in FIG. 4, a split sleeve S of an optical connector is generally constructed so as to receive the centering section of the ferrule to be attached, not in its entire length extending up to the flange section, but in a predetermined axial length extending up to a position slightly spaced from the flange section. The predetermined axial length of the centering section, as to be received in the split sleeve S, is herein referred to as "an axial effective length".

In the ferrule 50, the uncoated-fiber holding bore 60 and the coated-fiber holding bore 62 are formed under the structural correlation as follows. That is, when the axial length of the uncoated-fiber holding bore 60 is L1 (mm) and the axial effective length of the centering section 54 is L2 (mm), these axial lengths are selected to satisfy the formula:

$$L1 = L2 + \alpha$$

wherein $0.5 \text{ (mm)} \leq \alpha \leq 3.0 \text{ (mm)}$.

If this correlation exists between L1 and L2, only the uncoated-fiber holding bore 60 is formed especially in the axial effective length region of the centering section 54. As a result, a tubular wall 66 having a generally uniform thickness as a whole is given to the centering section 54. Therefore, when the ferrule 50 is integrally molded from a resinous material as a unitary body, the molding shrinkage of the resinous material, especially of the centering section 54, occurs in a balanced state, and, as a result, high dimensional precision (dimensional tolerance of outer diameter, cylindricity and circularity of the outer-circumferential centering reference surface 52, eccentricity of the uncoated-fiber holding bore 60 relative to the center axis 54a, etc.) can be attained for the centering section 54. Thus, the ferrule 50 can maintain the eccentricity of the uncoated-fiber holding bore 60 of the centering section 54 and the cylindricity and circularity of the outer-circumferential centering reference surface 52, which affect the connection loss of an optical fiber, at a high precision level of 0.1 to 1 mm applicable to a single mode optical fiber.

In order to define the range of difference α between lengths L1 and L2, the inventors of the present application have actually molded the ferrule 50 by varying the value α and measured the cylindricity of the outer-circumferential centering reference surface 52 of the centering section 54 for each α. The molded ferrules 50 are two types, that is, so-called a SC type (JIS) with L2=5.8 mm, and so-called a MU type (JIS) with L2=3.8 mm. The result of measurement of the cylindricity of the centering section 54 for each type of ferrules 50 is shown in FIGS. 9A and 9B.

Figure 9A:
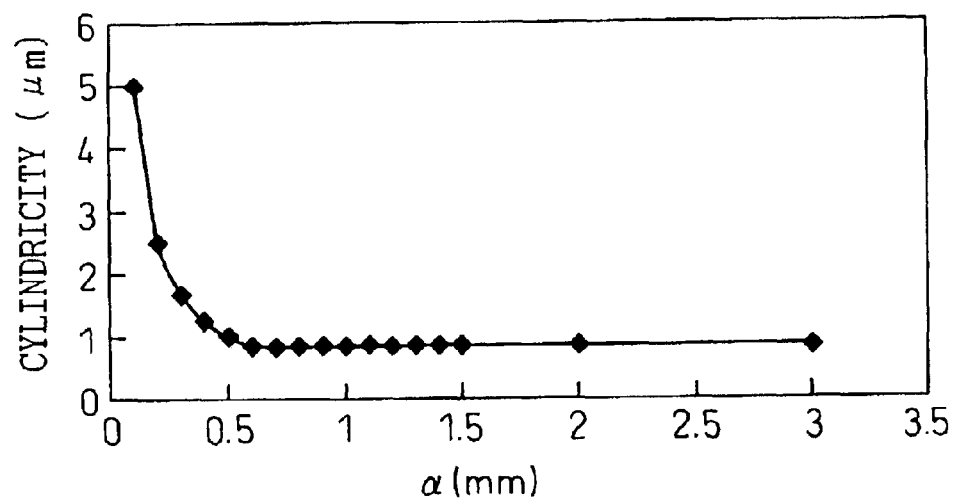
FIG. 9A shows a result of measuring the cylindricity of a centering section of the ferrule, shown in FIG. 7, in a case where the ferrule is SC type.
Figure 9B:
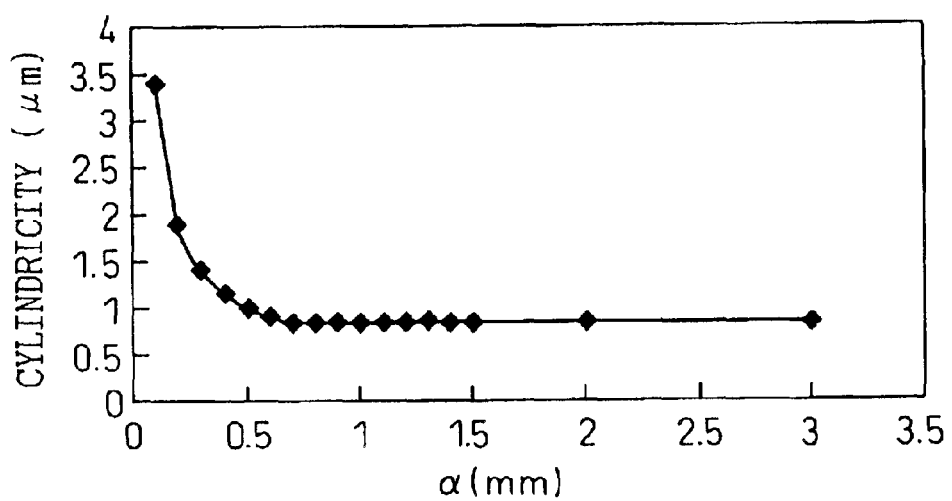
FIG. 9B shows a result of measuring the cylindricity of a centering section of the ferrule, shown in FIG. 7, in a case where the ferrule is a MU type.

The curve in FIG. 9A is a plot of measured values of cylindricity (mm) of the centering section 54 for a plurality of SC type ferrules 50 formed corresponding to various values of α. The curve in FIG. 9B is a plot of measured values of cylindricity (mm) of the centering section 54 for a plurality of MU type ferrules 50 formed corresponding to various values of α. As is evident from each of the drawings, the cylindricity becomes 1 mm or less for α≧0.5 mm, and, in this range, it can be construed that the required dimensional precision for the centering section 54 was achieved. For α0 less than 0.5 mm, the cylindricity of the centering section 54 seems to be degraded, which foreshadows an increase in the connection loss.

Also, in the ferrule 50, the upper limit of α is defined as 3.0 mm, so that an adhesive application region of sufficient length can be ensured for firmly fixing the coated optical fiber C by using an adhesive in the coated-fiber holding bore 62 extending from the flange section 56 to the guide section 58. If α exceeds 3.0 mm, the adhesive application region becomes inadequate, and the fixation strength of the coated optical fiber C in the ferrule 50 may be degraded.

Incidentally, in the construction of the ferrule 10 according to the first embodiment, even when the inner tube part 28 is made of a resinous material, it is possible to mold the outer tube part 26, having the tubular wall 30 of a generally uniform thickness as a whole, from a desired resinous material with a high dimensional precision. However, when the outer tube part 26 and the inner tube part 28, both molded from resinous material, are assembled to each other in a subsequent process, it is a concern that a small dimensional error may arise due to the assembling operation. Therefore, it is advantageous that a two-color molding method be employed, in which the outer tube part 26 and the inner tube part 28 are molded in a successive order from desired resinous material, to integrate them into a unitary body in the mold.

Figure 10A:
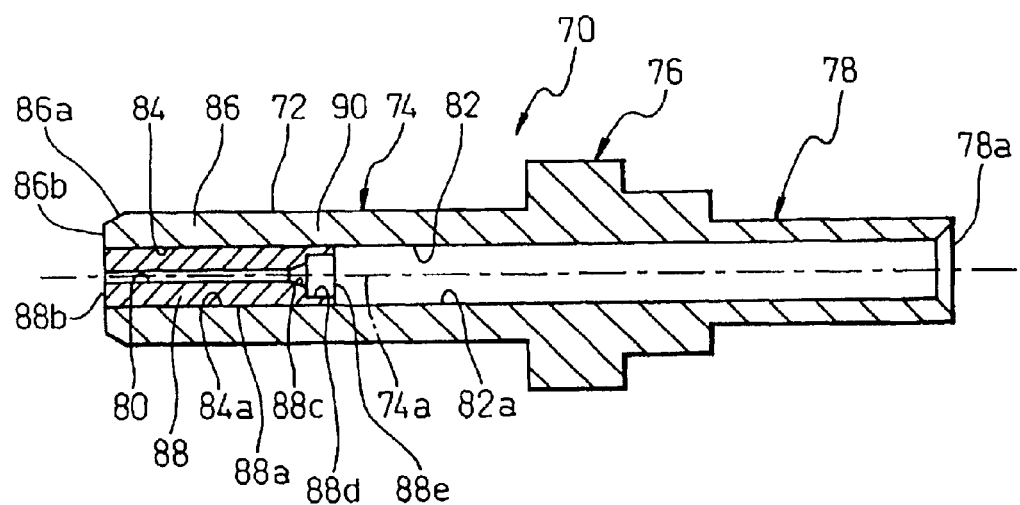
FIG. 10A is a sectional view of a plastic ferrule according to a third embodiment of the present invention.
Figure 10B:
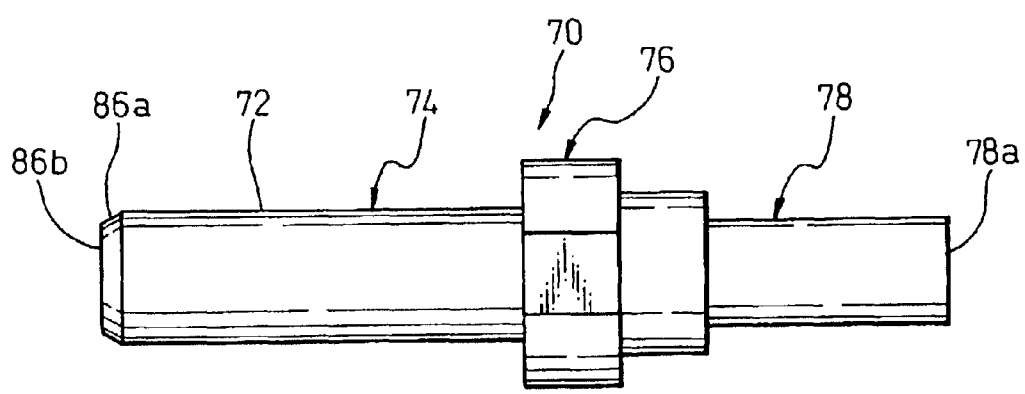
FIG. 10B is a front view of the plastic ferrule of FIG. 10A.

FIGS. 10A and 10B show a plastic ferrule 70 according to a third embodiment of the present invention, which is molded through such a two-color molding method. The ferrule 70 is comprised of a centering section 74 having a cylindrical outer circumferential surface 72, a flange section 76 provided adjacent to one axial end (or a proximal end) of the centering section 74 so as to project radially outwards, and a guide section 78 extending opposite to and concentric with the centering section 74 from the flange section 76. The centering section 74 is provided, along the center axis 74a thereof (that is, the center axis of the cylindrical outer circumferential surface 72), with a first, uncoated-fiber holding bore 80 for securely accommodating an uncoated optical fiber F (FIG. 4), and a second, coated-fiber holding bore 82 having a larger diameter than the uncoated-fiber holding bore 80, for securely accommodating a coated optical fiber C (FIG. 4), formed in communication with each other in axial direction.

The outer circumferential surface 72 of the centering section 74 serves as a centering reference surface for the uncoated optical fiber F accommodated in the uncoated-fiber holding bore 80 at the time of connection of optical fibers as described with reference to FIG. 4. The centering reference surface 72 extends in a straight line with uniform outer diametrical dimension from the vicinity of another axial end (or a distal end) of the centering section 74 to the proximal end of the centering section adjacent to the flange section 76. The flange section 76 is connected integrally to the centering section 74 as a unitary body, as a part for receiving biasing force in an axially forward direction exerted by a spring installed in the optical connector. The guide section 78 is integrally connected to the centering section 74 and the flange section 76 as a unitary body, as a part for holding the coated optical fiber C to be attached near the connecting end into a straight form and for ensuring an adhesive application region.

The centering section 74 of the ferrule 70 includes an outer tube part 86 having an outer-circumferential centering reference surface 72, a coated-fiber holding bore 82, and a third, fixing bore 84 extending from the coated-fiber holding bore 82 along the center axis 74a toward the distal end, and an inner tube part 88 having an uncoated-fiber holding bore 80 and received to be fixed into the fixing bore 84 of the outer tube part 86. In the illustrated embodiment, the outer tube part 86 and the inner tube part 88 are integrally molded as a unitary body from different resinous materials by the two-color molding method as described later. Alternatively, the outer tube part 86 and the inner tube part 88 may be molded by a similar two-color molding method from an identical resinous material.

As shown in FIG. 10A, the coated-fiber holding bore 82 and fixing bore 84 of the outer tube part 86 include inner circumferential surfaces 82a and 84a, respectively, linearly connected to each other with no step difference therebetween, while the center axis 74a is defined as the substantial centerlines of both surfaces, each surface having a uniform diametrical dimension. The outer-circumferential centering reference surface 72 is joined at the distal end portion of the outer tube part 86 via an annular tapered surface 86a to a generally flat distal end face 86b, and the fixing bore 84 opens in the distal end face 86b. Thus, in the outer tube part 86, a tubular wall 90 having a generally uniform thickness as a whole is formed between the outer-circumferential centering reference surface 72 and the inner circumferential surfaces 82a, 84a. The coated-fiber holding bore 82 linearly extends while maintaining the uniform inner diametrical dimension through the flange section 76 and the guide section 78, and opens at an axial end face 78a of the guide section 78. The outer tube part 86 constructed in this manner is formed integrally with the flange section 76 and the guide section 78 into a unitary body from a desired resinous material, such as a liquid crystal polymer, by, e.g., an injection molding process.

On the other hand, the inner tube part 88 has a cylindrical outer circumferential surface 88a being in close contact with the inner circumferential surface 84a of the fixing bore 84 of the outer tube part 86, and the uncoated-fiber holding bore 80 is formed substantially in alignment with the center axis of the outer circumferential surface 88a. The uncoated-fiber holding bore 80 extends linearly with a uniform diametrical dimension to open at one axial end face 88b of the inner tube part 88, and extends, via an annular tapered surface 88c gradually expanding in radial direction and a cylindrical surface 88d with uniform inner diametrical dimension, to open at the other axial end face 88e of the inner tube part 88.

In the two-color molding method for molding the ferrule 70, after either one of the outer tube part 86 and the inner tube part 88 is primary molded, the primary molded part is used as an insert, so as to secondary mold the other thereof. Therefore, either one of the inner circumferential surface 84a of the fixing bore 84 of the outer tube part 86 and the outer circumferential surface 88a of the inner tube part 88 is formed through the primary molding process, and the other thereof is formed through the secondary molding process so as to correspond to the surface of the primary molded part. In this manner, the gap between the inner circumferential surface 84a of the outer tube part 86 and the outer circumferential surface 88a of the inner tube part 88 can be completely eliminated. In particular, when the outer tube part 86 and the inner tube part 88 are molded from the identical resinous material, it is expected that the boundary between the inner circumferential surface 84a and the outer circumferential surface 88a may finally become unclear. However, when the outer tube part 86 is molded, a tubular wall 90 having a generally uniform thickness as a whole is molded, irrespective of whether it is formed in the primary or secondary molding, so that the molding shrinkage of resinous material of the outer tube part 86 occurs in a balanced state, and high dimensional precision of the centering section 74 (dimensional tolerance of outer diameter, cylindricity and circularity of the outer-circumferential centering reference surface 72, eccentricity of the uncoated-fiber holding bore 80 of the inner tube part 88 relative to the center axis 74a, etc.) can be achieved in a similar way to the ferrule 10.

Figure 11:
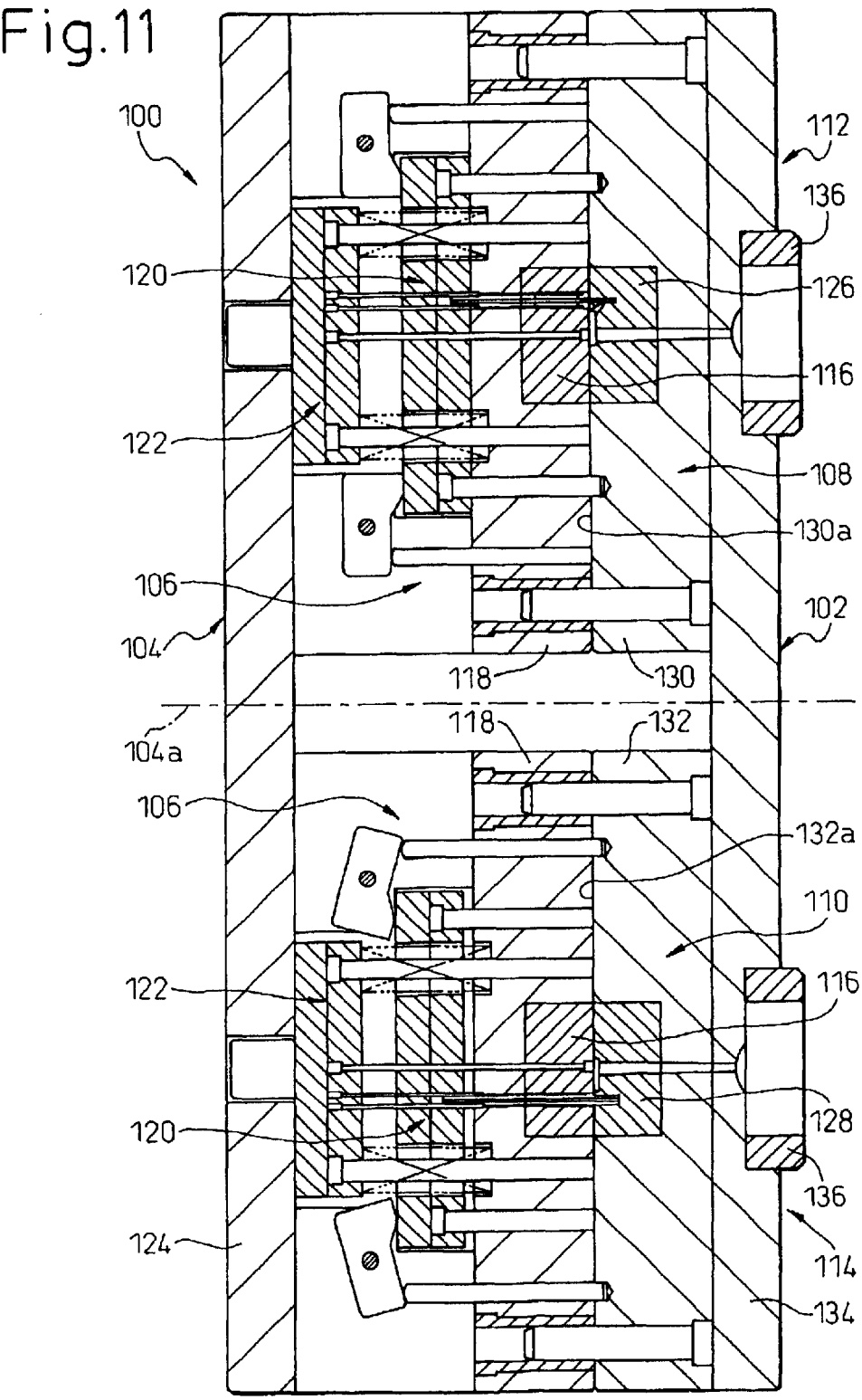
FIG. 11 shows, in a sectional view, one embodiment of a mold according to the present invention, for producing the ferrule as shown in FIG. 10A.

FIG. 11 shows a mold 100 for molding the ferrule 70, according to one embodiment of the present invention. The mold 100 has a known rotational structure for performing a two-color molding process, and includes a fixed-side structure 102 fixedly mounted to a mold clamping apparatus (not shown) of a molding machine (for example, an injection molding machine), and a movable-side structure 104 mounted to the mold clamping apparatus in such a manner as to be linearly movable for an open/close action. In addition, the movable-side structure 104 is rotatable relative to the fixed-side structure 102, in an opened position, about a rotation axis 104a parallel to an open/close direction.

In the movable-side structure 104, a pair of movable molds 106, having constructions identical to each other, are provided at positions opposing to each other about the rotation axis 104a. In the fixed-side structure 102, first and second fixed molds 108, 110, having constructions different from each other, are provided at positions permitting them to be combined with respective movable molds 106. The first fixed mold 108 cooperates with one of the movable molds 106 to compose a primary mold 112 for molding the inner tube part 88 of the ferrule 70. The second fixed mold 110 cooperates with one of the movable molds 106 to compose a secondary mold 114 for molding the outer tube part 86 of the ferrule 70 in a condition where the molded inner tube part 88 accommodated as an insert therein.

A pair of movable molds 106, composing the primary mold 112 and the secondary mold 114, respectively include mold plates 118 to which cavity members 116 having identical molding surfaces are mounted, movable core mechanisms 120 for forming the uncoated-fiber holding bores 80 of the ferrules 70, and ejection mechanisms 122 for ejecting molded products from the mold. The movable molds 106 are supported on a movable-side mounting plate 124 which in turn is operatively connected to a mold clamping mechanism and a rotation mechanism (not shown).

The fixed mold 108 of the primary mold 112 and the fixed mold 110 of the secondary mold 114 respectively include mold plates 130 and 132 to which cavity members 126 and 128 having mold surfaces with different profiles are mounted. The mold plates 130, 132 are provided respectively with end faces 130a, 132a, as parting surfaces, which have constructions different from each other. The fixed molds 108, 110 are supported on a fixed-side mounting plate 134 which in turn is fixedly located at a predetermined position on the mold clamping apparatus (not shown) via a pair of locate-rings 136 corresponding to the fixed molds 108, 110.

Further details of the mold 100, and a manufacturing method for manufacturing the ferrule 70 through a two-color molding process using the mold 100, according to one embodiment of the present invention, will be described with reference to FIGS. 12 to 27.

Figure 12:
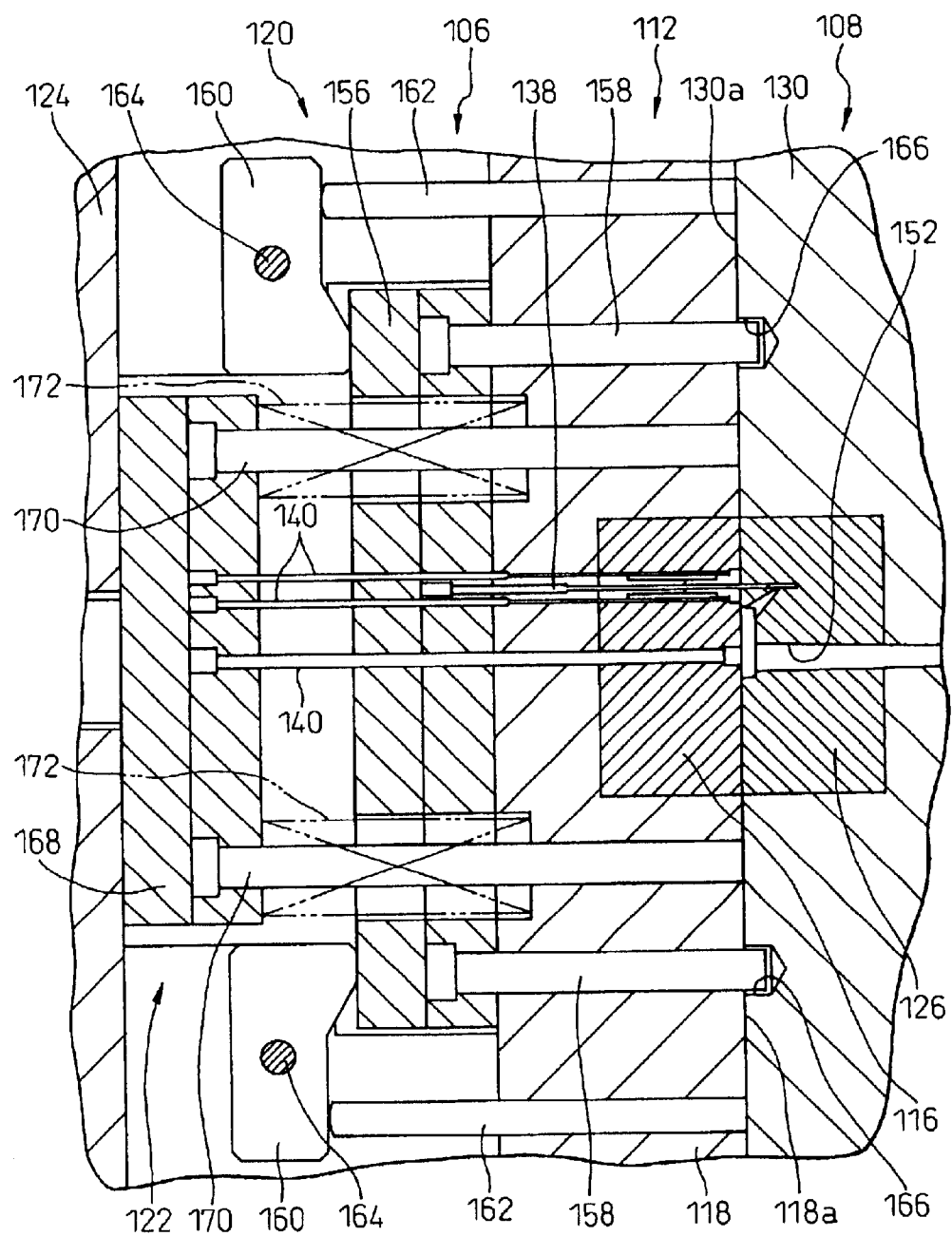
FIG. 12 shows, in a sectional view, a primary mold, of the mold shown in FIG. 11, in a mold clamping state.

First, the inner tube part 88 of the ferrule 70 is molded in the primary mold 112. When the primary mold 112 is in a mold clamping state as shown in FIG. 12, the mold plate 118 of the movable mold 106 is closely abutted at the end face 118a thereof to the end face 130a of the mold plate 130 of the fixed mold 108, and the movable core mechanism 120 locates a core pin 138 for forming the uncoated-fiber holding bore 80 of the inner tube part 88 at an operative position, and the ejection mechanism 122 locates a plurality of ejector pins 140 for ejecting the molded product at inoperative positions.

Figure 13:
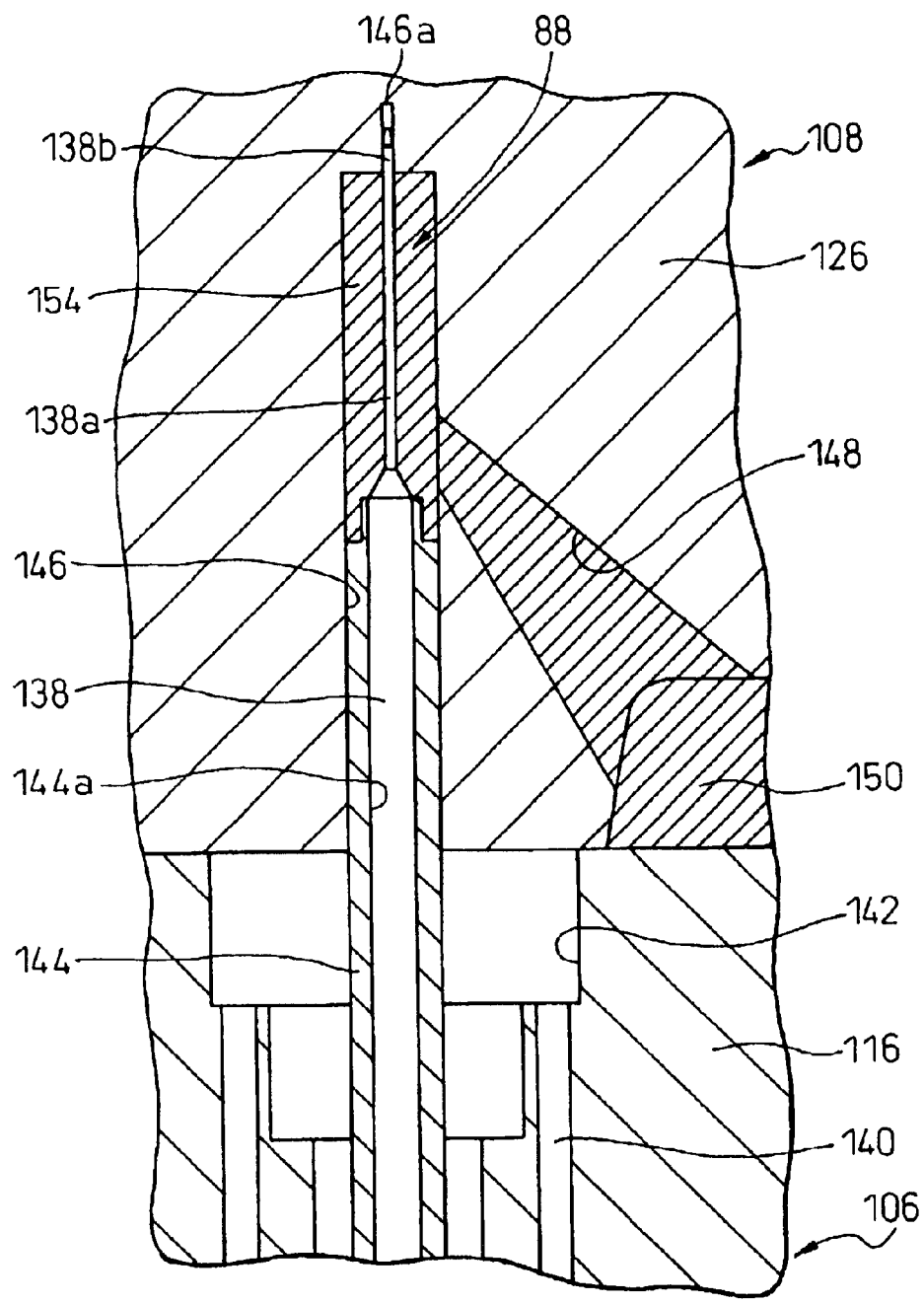
FIG. 13 is an enlarged sectional view of a part of the primary mold as shown in FIG. 12.

As shown in FIG. 13, the cavity member 116 mounted to the mold plate 118 of the movable mold 106 is provided with a recess 142 for forming the flange section 76 and the guide section 78 of the ferrule 70, and a cylindrical core 144 extending into the recess 142 to form the coated-fiber holding bore 82 of the outer tube part 86. The cylindrical core 144 receives the core pin 138 in the axial through-hole 144a in an axially slidable manner. The cavity member 116 is also provided with a plurality of through-holes for individually receiving a plurality of ejector pins 140 in an axially slidable manner. On the other hand, the cavity member 126 mounted on the mold plate 130 of the fixed mold 108 is provided with a recess 146 for molding the inner tube part 88 of the ferrule 70, and a material passage (that is, a gate 148, a runner groove 150 and a sprue groove 152) communicating with the recess 146.

When the primary mold 112 is in the mold clamping state, the cylindrical core 144 of the movable mold 106 is received, at a predetermined length near its distal end, in the recess 146 of the fixed mold 108 in a liquid-tight manner at least for the molten resinous material of the inner tube part 88. At the same time, the core pin 138 is securely held, at a small-diameter portion 138a near the distal end thereof, on a predetermined position in the recess 146 while projecting from the open end of the cylindrical core 144. In this state, the outer surfaces of the core pin 138 and the cylindrical core 144 cooperate with the inner surface of the recess 146, so as to define a first mold cavity 154 having a profile corresponding to the inner tube part 88. The gate 148 opens to this mold cavity 154. The recess 142 of the movable mold 106 is isolated from the material passage (the gate 148, the runner groove 150 and the sprue groove 152) by the liquid-tight engagement of the cylindrical core 144 with the recess 146, so as at least to prevent the inflow of molten resinous material for the inner tube part 88.

The movable core mechanism 120 includes a supporting plate 156 for securely supporting the core pin 138, a pair of guide pins 158 fixed to the supporting plate 156, a pair of rotational cam plates 160 abutted at the first peripheral edges thereof to the supporting plate 156, and a pair of actuating pins 162 respectively abutted to the second peripheral edges of the rotational cam plates 160. The supporting plate 156 and the rotational cam plates 160 are disposed between the mold plate 118 of the movable mold 106 and the movable-side mounting plate 124, and the core pin 138, the guide pins 158 and the actuating pins 162 are disposed, so as to penetrate the mold plate 118 in an axially movable manner and to permit the distal end regions of these pins to project from the end face 118a of the mold plate 118. The supporting plate 156 is allowed to translate in an axial direction (that is, in parallel to the rotation axis 104a) relative to the mold plate 118 under the sliding engagement of the mold plate 118 with the guide pins 158.

In the mold clamping state of the movable core mechanism 120 as shown in FIG. 12, the actuating pins 162 are abutted at the distal end faces thereof to the end face 130a of the mold plate 130 of the fixed mold 108 to be forced into the mold plate 118, and the rotational cam plates 160 are thereby rotated about pivots 164 so as to push the supporting plate 156 to an advanced position to come into contact with the mold plate 118. As a result, the core pin 138 is located at the operative position shown in FIG. 13. In this operative position, the core pin 138 projects at its small-diameter portion 138a from the open end of the cylindrical core 144 into the recess 146 of the fixed mold 108 as described above, and the distal end 138b is fitted into a groove hole 146a formed in the bottom wall surface of the recess 146 in a liquid-tight manner, so that the core pin 138 is securely held at a predetermined position in the recess 146. In this position, the guide pins 158 project at the distal ends thereof from the end face 118a of the mold plate 118 and are smoothly received in a pair of depressions 166 provided on the end face 130a of the mold plate 130 of the fixed mold 108.

The ejection mechanism 122 includes a supporting plate 168 for securely supporting a plurality of (three, in the drawing) ejector pins 140, a pair of guide pins 170 fixed to the supporting plate 168, and a pair of biasing members 172 arranged between the mold plate 118 and the supporting plate 168 in association with respective guide pins 170. The supporting plate 168 is disposed between the supporting plate 156 of the movable core mechanism 120 and the movable-side mounting plate 124, and three ejector pins 140 and a pair of guide pins 170 are disposed so as to penetrate the supporting plate 156 and the mold plate 118 in axially movable manner and to permit the distal end regions of these pins to project from the end face 118a of the mold plate 118. A pair of biasing member 172, each formed from, e.g., a compression spring, are disposed so as to penetrate the supporting plate 156 to bias the supporting plate 168 in the direction away from the mold plate 118. The supporting plate 168 is allowed to translate in an axial direction (that is, in parallel to the rotation axis 104a) relative to the mold plate 118, under the slidable engagement of the mold plate 118 with a pair of guide pins 170 and under the biasing force of the biasing members 172.

In the mold clamping state of the ejection mechanism 122 as shown in FIG. 12, the guide pins 170 are abutted at the distal end faces thereof to the end face 130a of the mold plate 130 of the fixed mold 108, and the supporting plate 168 is located in a retracted position to be brought into contact with the movable-side mounting plate 124 under the biasing force of the biasing members 172. As a result, three ejector pins 140 are arranged in the inoperative positions shown in FIGS. 12 and 13. In the inoperative position, each ejector pin 140 locates its distal end face inside the recess 142 of the cavity member 116 mounted on the mold plate 118 and inside the through-hole axially aligned with the sprue groove 152 of the mold plate 108.

In this mold clamping state, a desired molten resinous material is supplied to the mold cavity 154 via the material passages 148, 150, 152. During this process, the small-diameter portion 138a of the core pin 138 is fixedly held in a predetermined position against a material supplying pressure by the engagement of the distal end 138b with the groove hole 146a of the recess 146. By solidifying the resinous material in this state, the inner tube part 88 is molded in the mold cavity 154.

Figure 14:
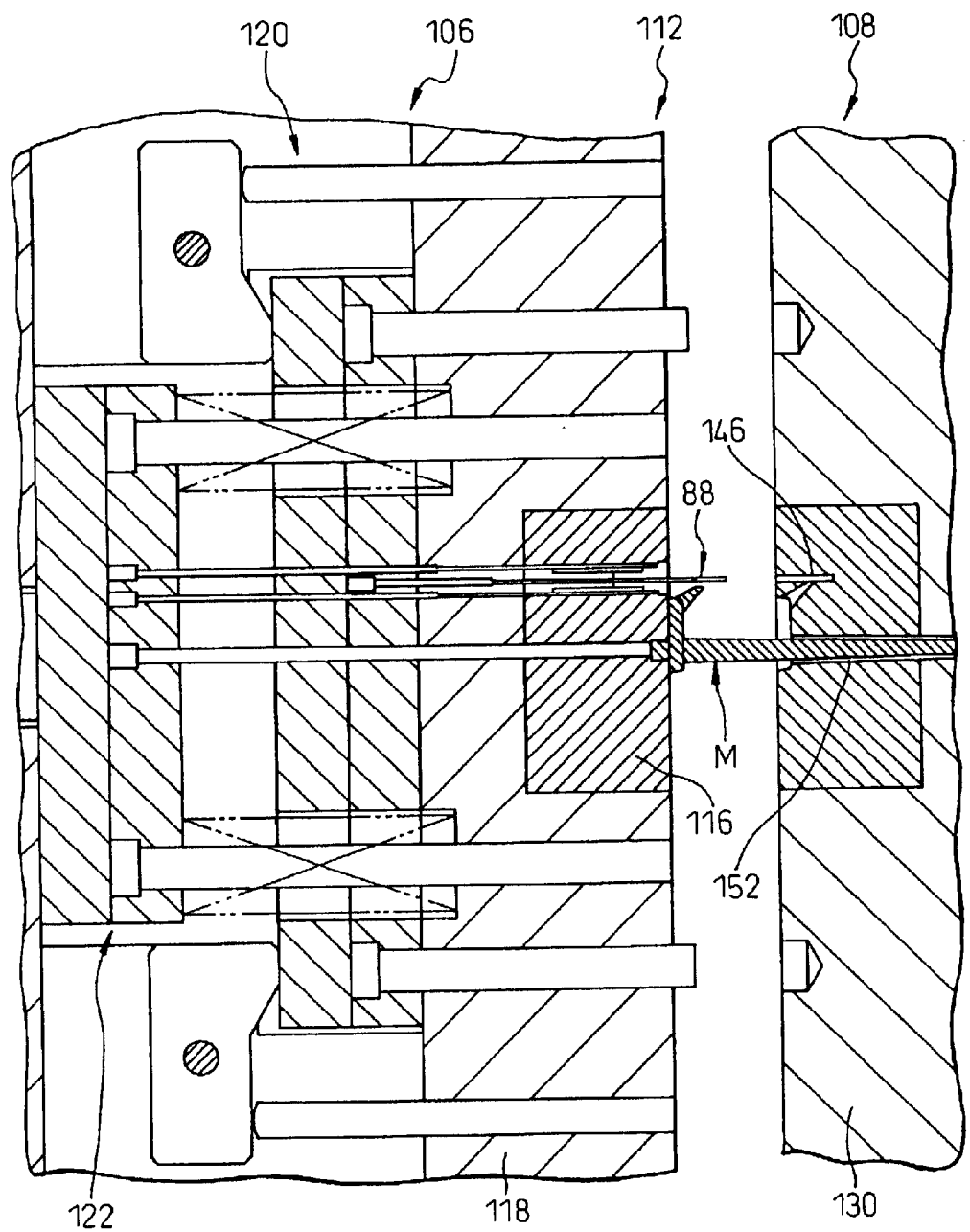
FIG. 14 shows, in a sectional view, the primary mold, shown in FIG. 12, in a mold opening state.
Figure 15:
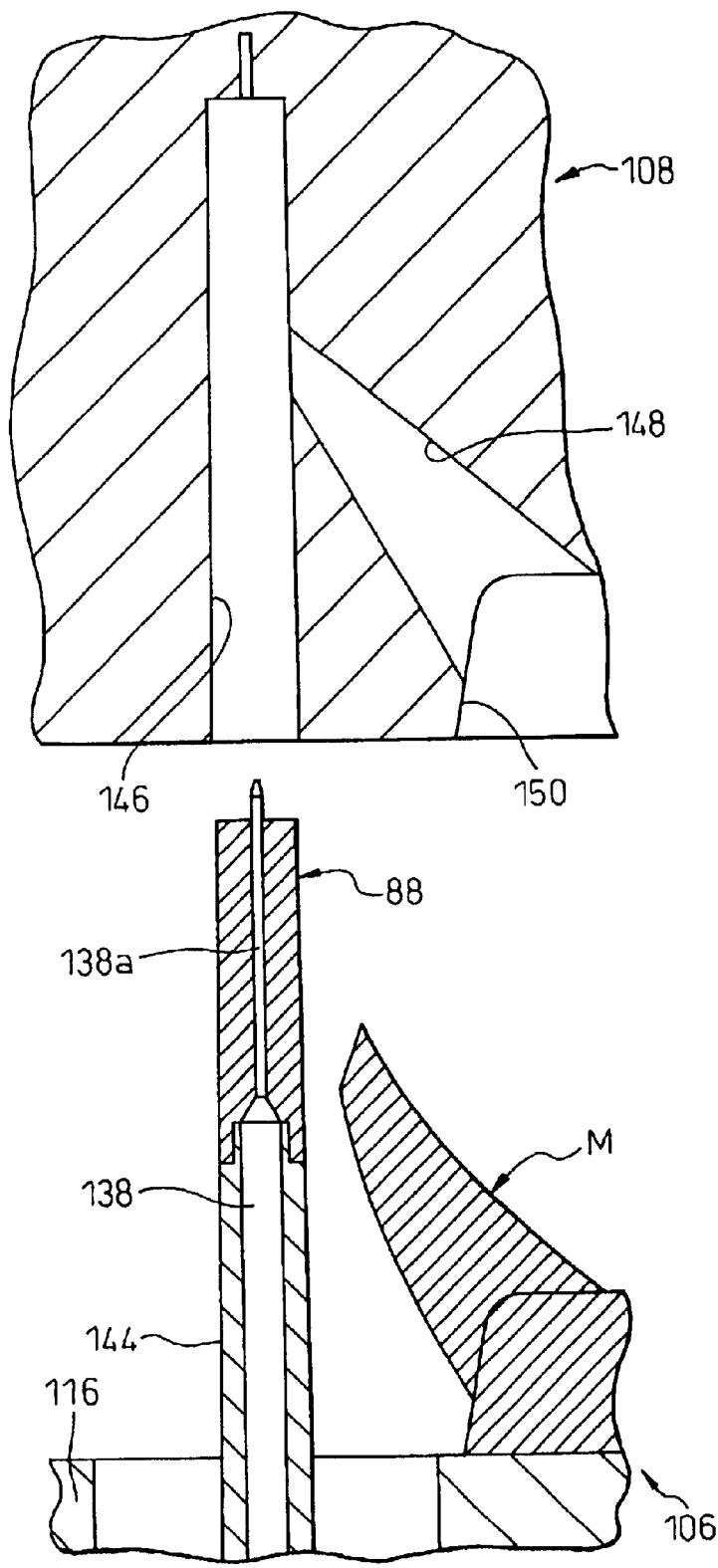
FIG. 15 is an enlarged sectional view of a part of the primary mold as shown in FIG. 14.

From the above-described mold clamping state, the mold clamping mechanism is driven to separate the movable-side structure 104 from the fixed-side structure 102 so as to open the primary mold 112. Then, as shown in FIGS. 14 and 15, the molded inner tube part 88 is held on the core pin 138 and cylindrical core 144 of the movable mold 106 and is disengaged from the recess 146 of the fixed mold 108. Similarly, an auxiliary material portion M solidified in the material passages 148, 150, 152 of the fixed mold 108 is engaged with the cavity member 116 in a dovetail form to be held on the movable mold 106, and is disengaged from the material passages 148, 150, 152. At the same time, the inner tube part 88 is cut apart from the auxiliary material portion M at the opening end of the gate 148.

Figure 16:
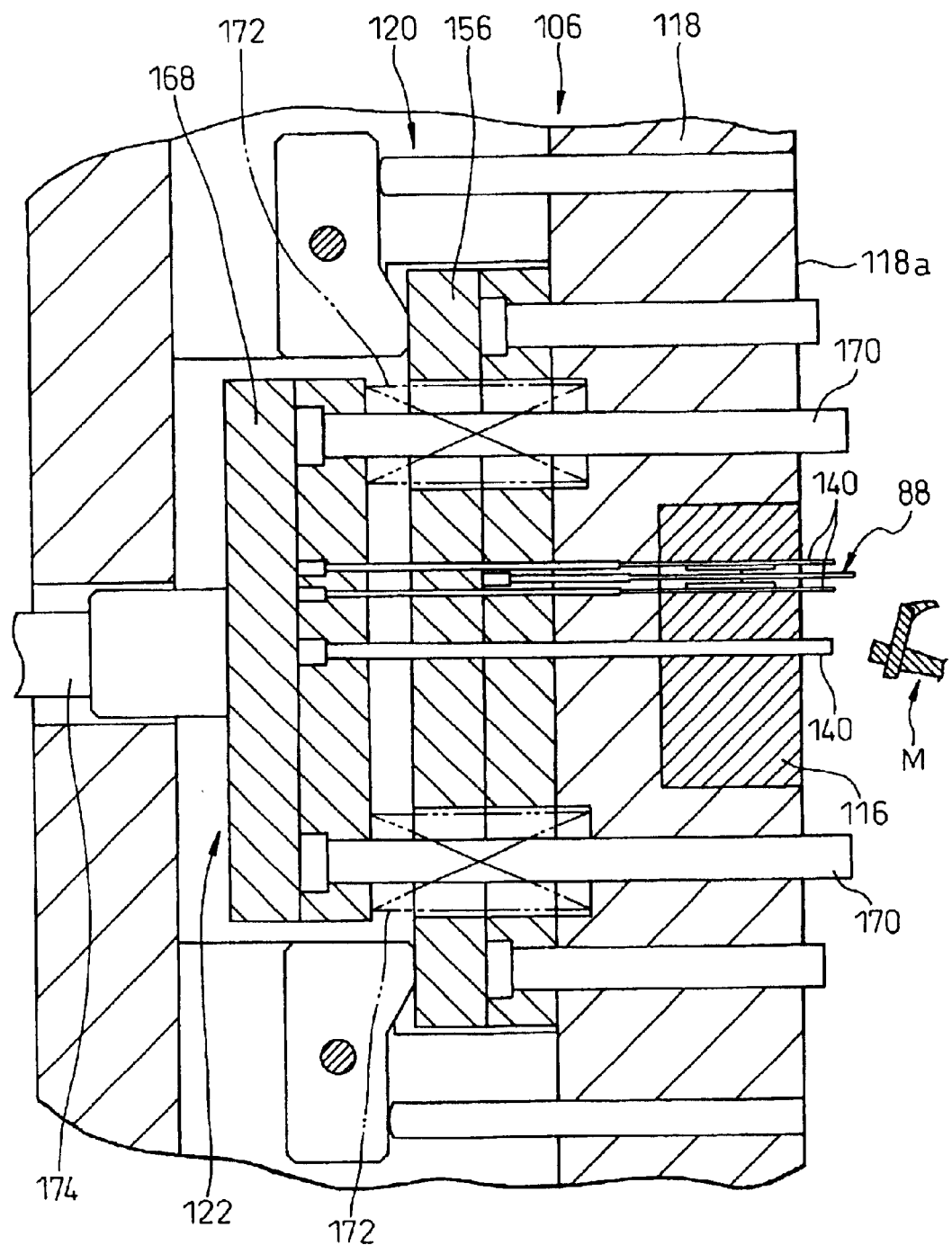
FIG. 16 shows, in a sectional view, a molded-product ejecting operation in the primary mold of FIG. 12.
Figure 17:
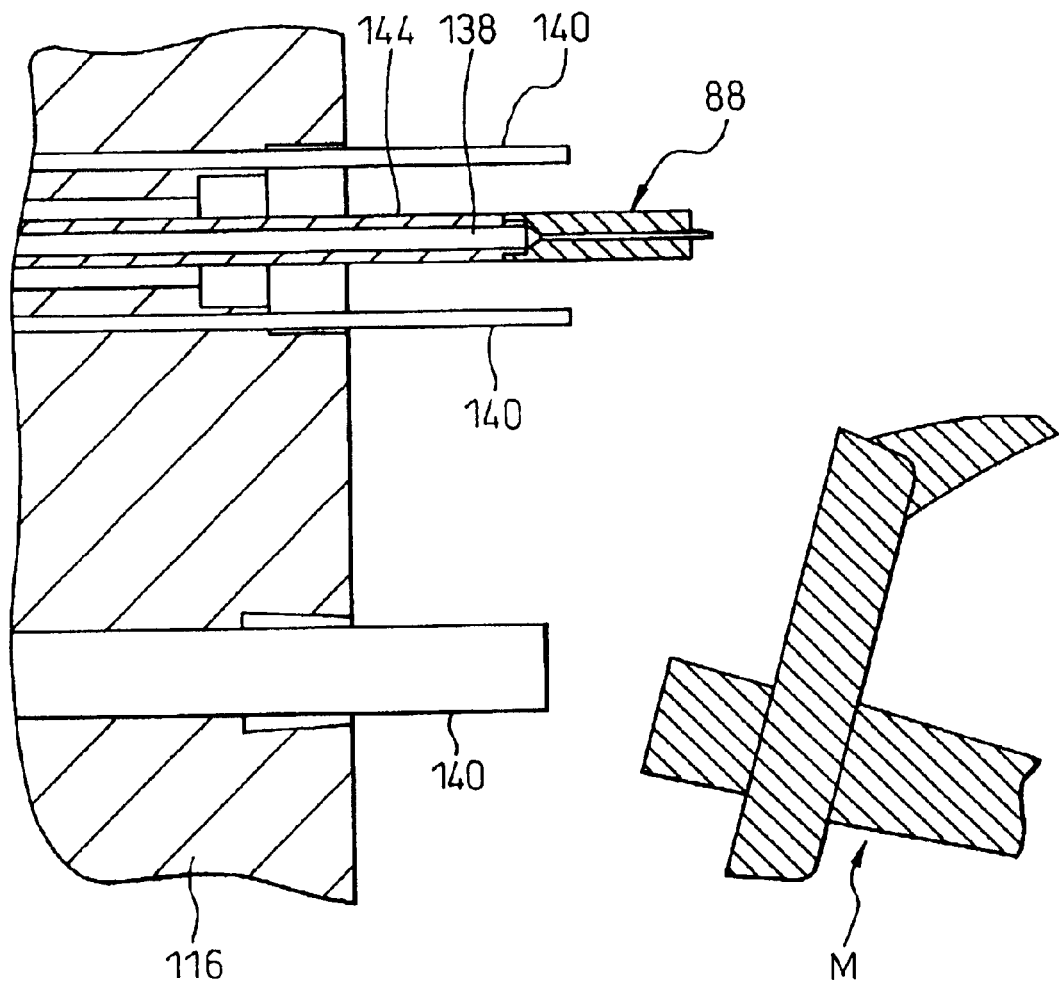
FIG. 17 is an enlarged sectional view of a part of the primary mold as shown in FIG. 16.

In the state with the primary mold 112 completely opened, as shown in FIG. 16, the supporting plate 168 of the ejection mechanism 122 is pushed by an external operating member 174 to be moved against the biasing force of the biasing member 172 in a direction toward the supporting plate 156 of the movable core mechanism 120. Three ejector pins 140 supported by the supporting plate 168 thereby project at the distal ends thereof outwards from the cavity member 116 mounted on the mold plate 118. As a result, the auxiliary material portion M is ejected from the movable model 106 while the dovetail-like engaged portion is pushed out of the cavity member 116 by one of the ejector pins 140. Two other ejector pins 140 project from the cavity member 116 without colliding with the inner tube part 88, so that the inner tube part 88 is maintained in the state of being held on the core pin 138 and the cylindrical core 144 of the movable model 106.

When the auxiliary material portion M is completely ejected, the movable-side structure 104 is rotated 180 degrees about the rotation axis 104a by a rotation mechanism (not shown), so that the movable mold 106 holding the inner tube part 88 is positioned in opposition to the fixed model 110 composing the secondary model 114. Then, the model clamping mechanism is operated to bring the movable-side structure 104 toward the fixed-side structure 102 and to hold the secondary model 114 in the mold clamping state.

Figure 18:
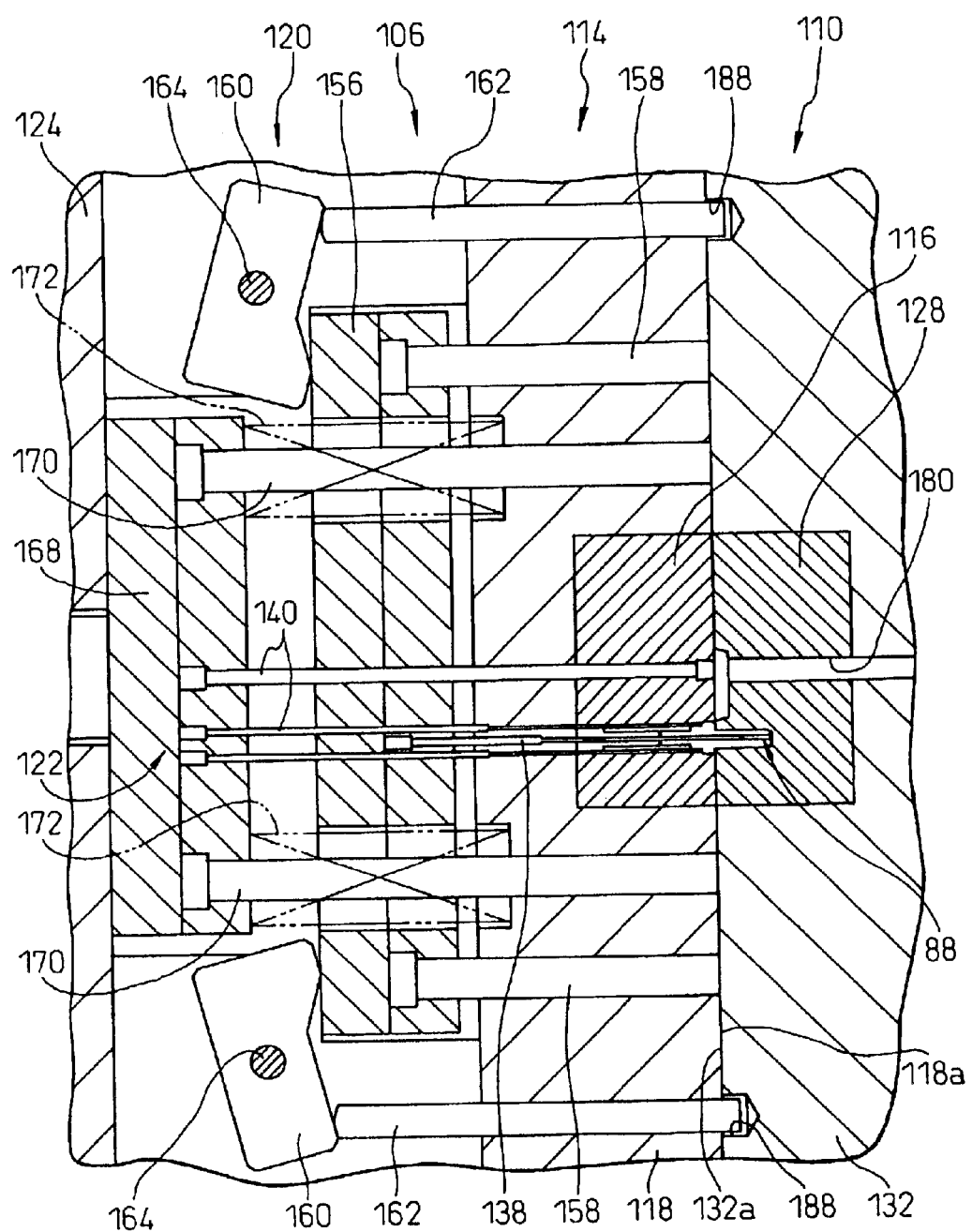
FIG. 18 shows, in a sectional view, a secondary mold, of the mold shown in FIG. 11, in a mold clamping state.
Figure 19:
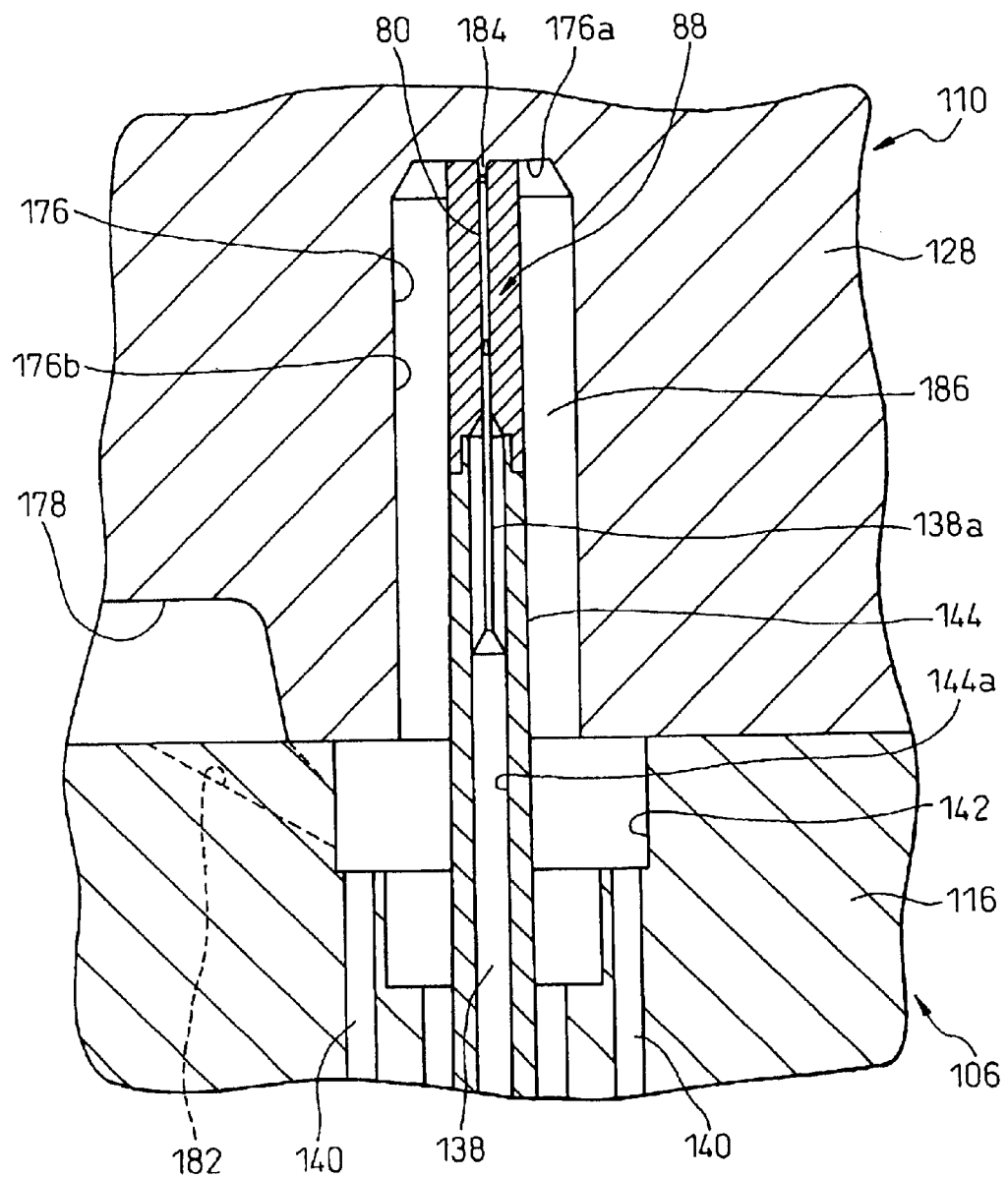
FIG. 19 is an enlarged sectional view of a part of the secondary mold as shown in FIG. 18.
Figure 20:
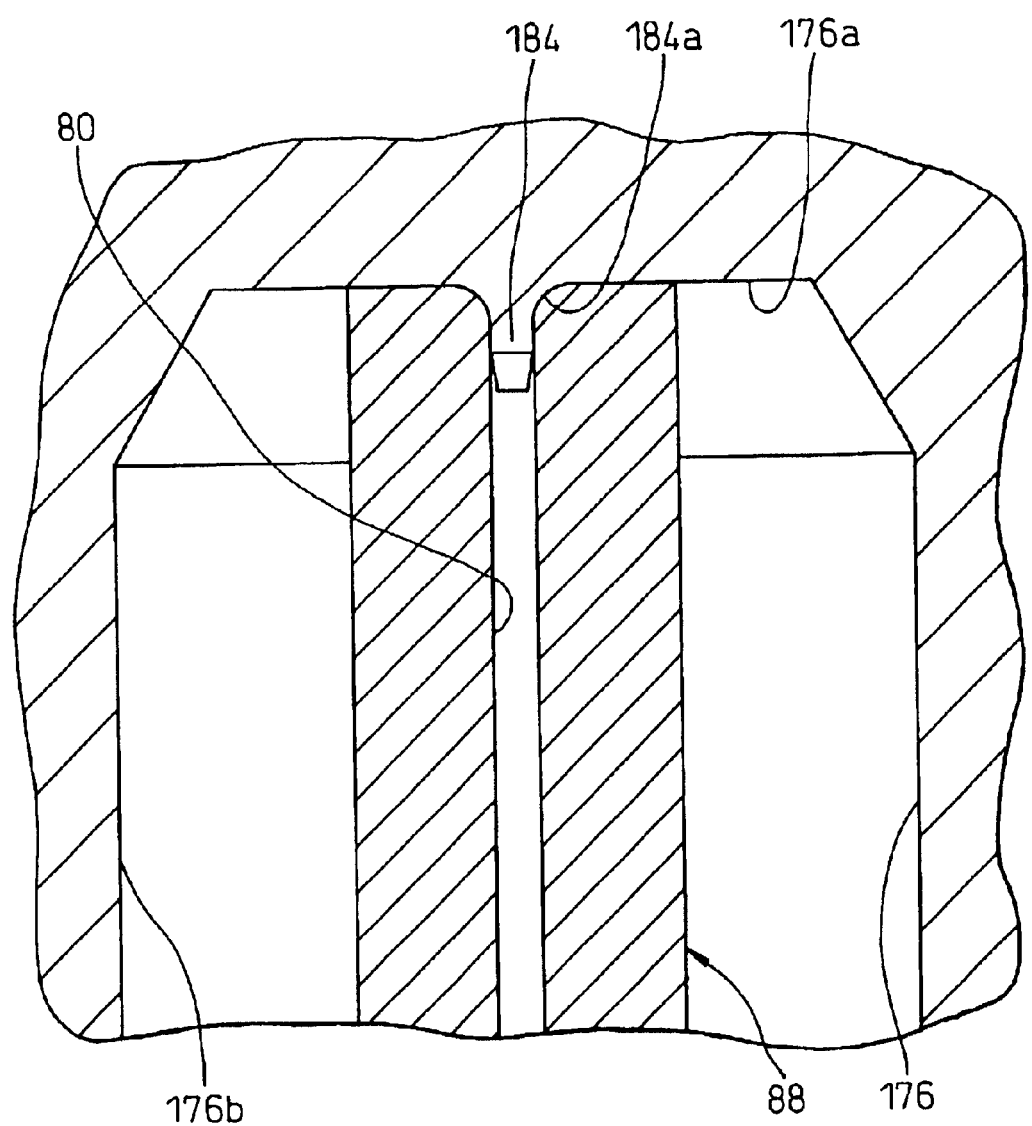
FIG. 20 is an enlarged sectional view of a part of the secondary mold as shown in FIG. 19.

When the secondary mold 114 is in the mold clamping state as shown in FIG. 18, the mold plate 118 of the movable mold 106 is closely abutted at its end face 118a to the end face 132a of the mold plate 132 of the fixed mold 110, the movable core mechanism 120 locates the core pin 138 in the inoperative position, and the ejection mechanism 122 locates three ejector pins 140 in the inoperative positions. The cavity member 128 mounted on the mold plate 132 of the fixed mold 110 is provided with the recess 176 for molding the outer tube part 86 of the ferrule 70 and a material passage (that is, a runner groove 178 and a sprue groove 180). A gate 182 opening to the recess 142 is provided in advance in the cavity member 116 of the movable mold 106, at a position where the gate does not communicate with the runner groove 150 of the fixed mold 108 when the movable mold 106 cooperates with the fixed mold 108 to compose the primary mold 112 (FIG. 19). When the movable mold 106 cooperates with the fixed mold 108 to compose the secondary mold 114, the runner groove 178 of the fixed mold 110 is in fluid communication with the gate 182 of the movable mold 106.

When the secondary mold 114 is in the mold clamping state, the inner tube part 88 is received in the recess 176 of the fixed mold 110 with a predetermined gap defined therebetween, together with the predetermined lengths of the core pin 138 and cylindrical core 144 of the movable mold 106. The core pin 138 is thereby located, by the action of the movable core mechanism 120 as described later, at an inoperative position where the small-diameter portion 138a is partially retracted in the cylindrical core 144. At the same time, the inner tube part 88 supported on the core pin 138 and cylindrical core 144 is brought at one axial end face 88b into close contact with the bottom wall surface 176a of the recess 176, and the positioning protrusion 184 projected on the bottom wall surface 176a is closely fitted in the opening end of the uncoated-fiber holding bore 80. The inner tube part 88 is thereby securely held in a predetermined position in the recess 176. The recess 176 of the fixed mold 110 is communicated at the opening end thereof with the recess 142 of the movable mold 106, and thus with the material passage (the gate 182, the runner groove 178 and sprue groove 180). In this state, the outer surfaces of the inner tube part 88 and the cylindrical core 144 cooperate with the inner surfaces of the recess 176 and the recess 142, to define the second mold cavity 186 having a profile corresponding to the outer tube part 86, the flange section 76 and the guide section 78 (FIG. 10A).

In order to ensure that the eccentricity of the uncoated-fiber holding bore 80 of the inner tube part 88 relative to the center axis 74a of the centering section 74 (FIG. 10A) is reduced to a required precision level after the outer tube part 86 is formed to complete the fabrication of the ferrule 70, it is necessary to form the positioning protrusion 184 provided on the bottom wall surface 176a of the recess 176 by precisely positioning it in a center position relative to the cylindrical inner circumferential surface 176b of the recess 176 for molding the outer-circumferential centering reference surface 72. It is also preferred that, when molding the outer tube part 86, the positioning protrusion 184 be pressed into the opening end of the uncoated-fiber holding bore 80 of the inner tube part 88, in order to precisely locate and securely hold the inner tube part 88 at a predetermined position. To this end, it is advantageous that the positioning protrusion 184 be joined to the bottom wall surface 176a of the recess 176 via a transition surface 184a (FIG. 20) curved concavely at the proximal end of the protrusion 184. With this construction, by pressing the transition surface 184a to the opening end of the uncoated-fiber holding bore 80 of the inner tube part 88, the contact area of the positioning protrusion 184 with the inner tube part 88 can be increased, so that the inner tube part 88 can be firmly held in the predetermined position against the pouring pressure of the resinous material into the recess 176.

In the mold clamping state of the movable core mechanism 120 as shown in FIG. 18, the guide pins 158 are abutted at the distal ends thereof to the end face 132a of the mold plate 132 of the fixed mold 110 so as to be pressed into the mold plate 118, and the supporting plate 156 is thereby moved to a retracted position away from the mold plate 118. As a result, the core pin 138 is located at the above-described inoperative position as shown in FIG. 19. At the same time, the rotational cam plates 160 are pushed by the supporting plate 156 to rotate about the axis 164, so as to push the corresponding actuating pins 162 in a direction where the distal ends thereof project from the end face 118a of the mold plate 118. Then, the distal ends of the actuating pins 162 are smoothly received in a pair of depressions 188 provided on the end face 132a of the mold plate 132 of the fixed mold 110. In the mold clamping state as shown in FIG. 18, the ejection mechanism 122 locates three ejector pins 140 at the inoperative positions shown in FIGS. 18 and 19, in a similar way to the location in the mold clamping state of the primary mold 112.

In this mold clamping state, a desired molten resinous material is supplied to the mold cavity 186 via the material passages 178, 180 of the fixed mold 110 and the material passage 182 of the movable mold 106. During this step, the inner tube part 88 is securely held against the material supplying pressure at a predetermined position, by the engagement of the opening end of the uncoated-fiber holding bore 80 with the positioning protrusion 184 of the recess 176. In this state, by solidifying the resinous material, the outer tube part 86, the flange section 76 and the guide section 78 are molded in the mold cavity 186, and the outer tube part 86 and the inner tube part 88 are integrally joined to form the centering section 74. In this way, the entire ferrule 70 is molded.

Figure 21:
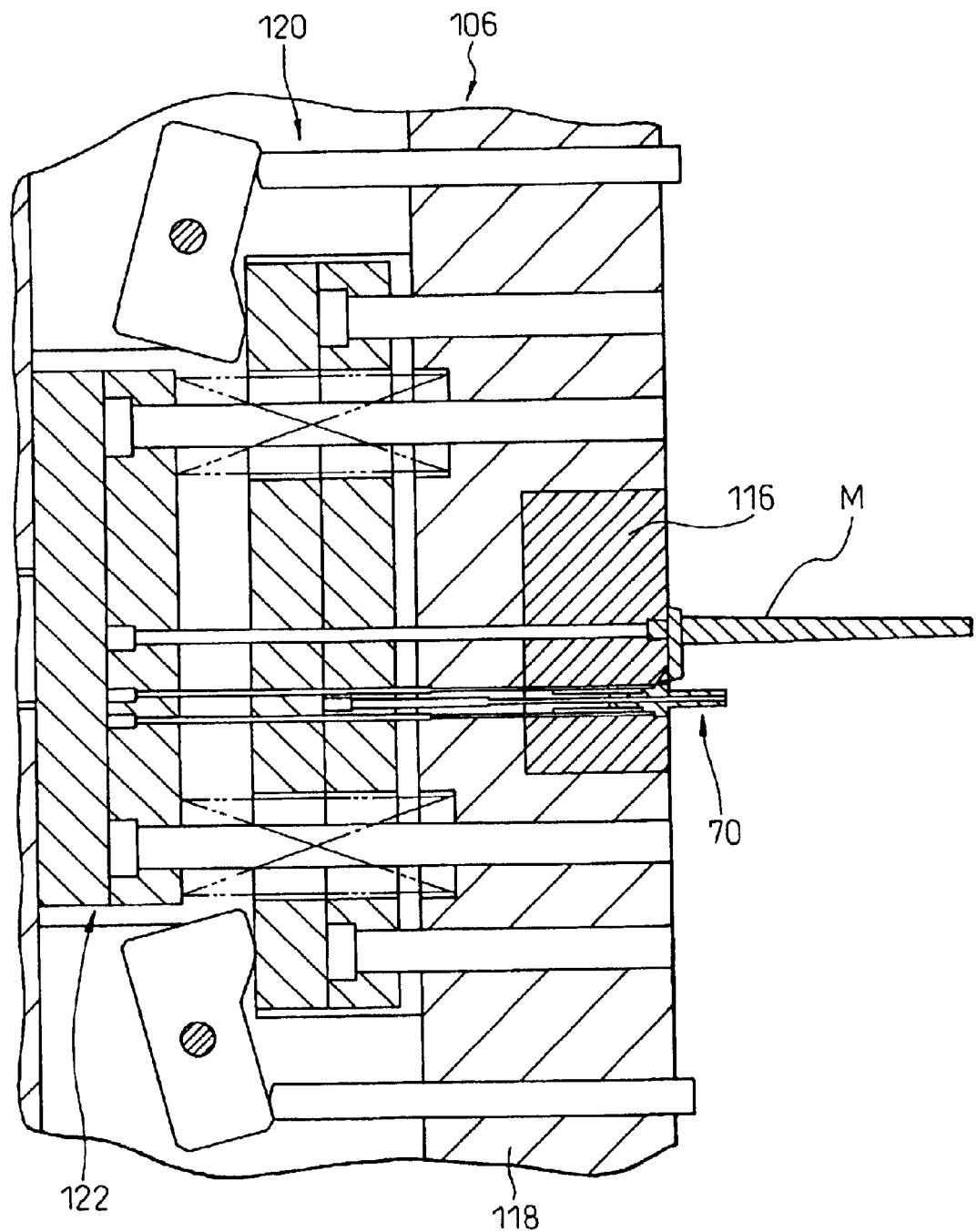
FIG. 21 shows, in a sectional view, the secondary mold, shown in FIG. 18, in a mold opening state.
Figure 22:
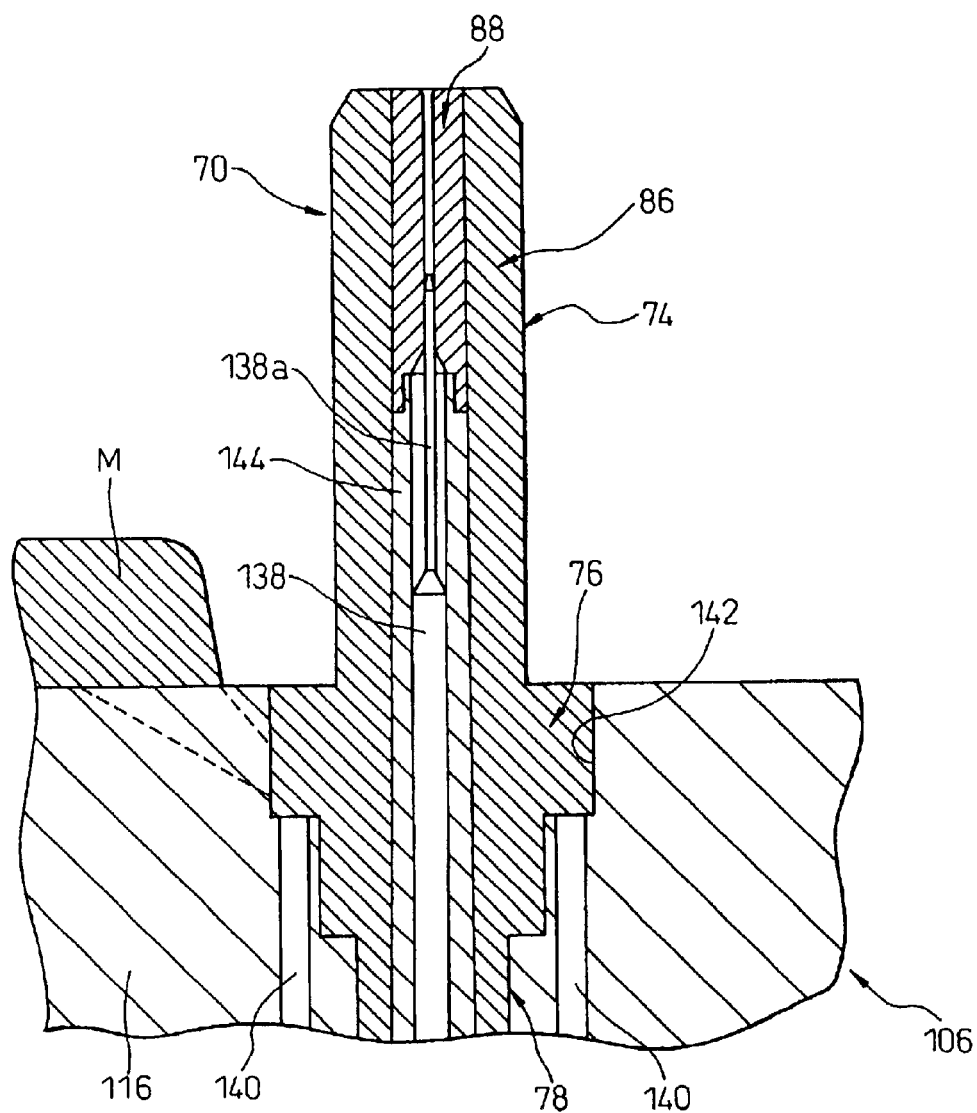
FIG. 22 is an enlarged sectional view of a part of the secondary mold as shown in FIG. 21.

From the above-described mold clamping state, the mold clamping mechanism is driven to separate the movable-side structure 104 from the fixed-side structure 102 so as to open the secondary mold 114. As shown in FIGS. 21 and 22, the molded ferrule 70 is held in the recess 142 of the movable mold 106 and on the cylindrical core 144 thereof, and is disengaged from the recess 176 of the fixed mold 110. Similarly, the auxiliary material portion M, solidified in the material passages 178, 180 of the fixed mold 110 and in the material passage 182 of the movable mold 106, is held on the movable mold 106 by the engagement with the cavity member 116, and is disengaged from the material passages 178, 180.

Figure 23:
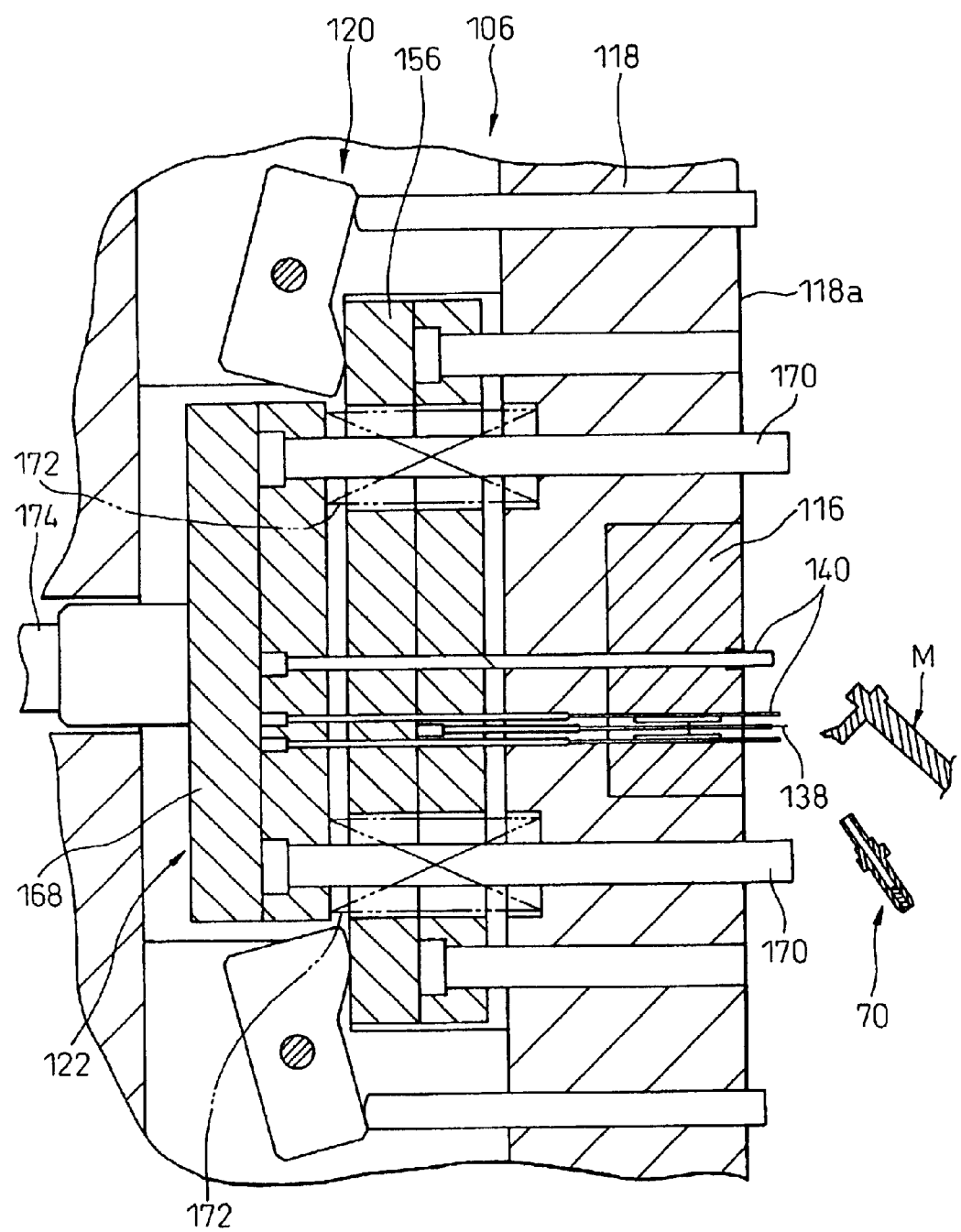
FIG. 23 shows, in a sectional view, a molded-product ejecting operation in the secondary mold of FIG. 18.
Figure 24:
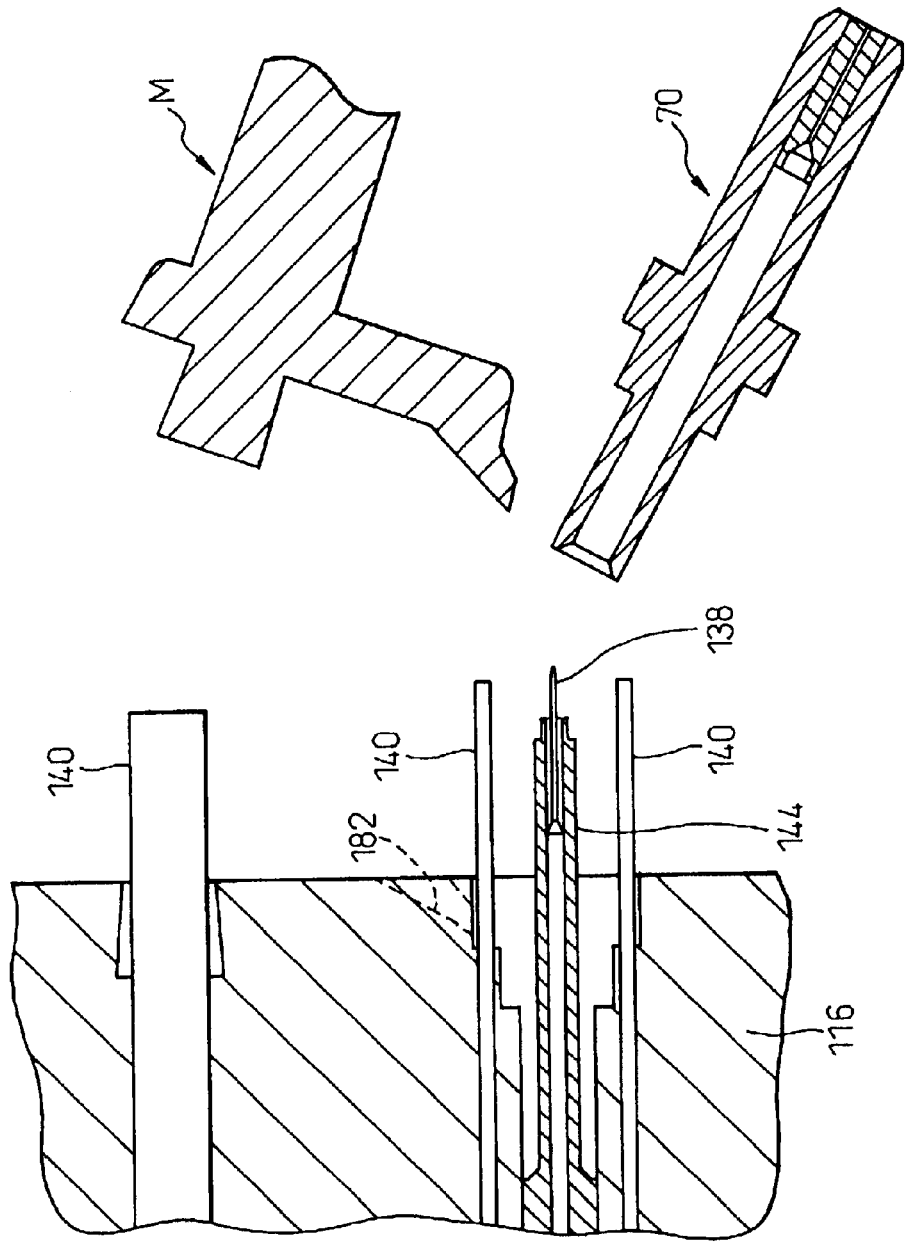
FIG. 24 is an enlarged sectional view of a part of the secondary mold as shown in FIG. 23.

In the state in which the secondary mold 114 is completely opened, as shown in FIG. 23, the supporting plate 168 of the ejection mechanism 122 is pressed by the external operating member 174, and is moved against the biasing force of the biasing member 172 in the direction toward the supporting plate 156 of the movable core mechanism 120. Distal ends of three ejector pins 140 supported by the supporting plate 168 thereby project outwards from the cavity member 116 mounted on the mold plate 118. As a result, as shown in FIG. 24, the dovetail-like engaged portion of the auxiliary material portion M is pushed out of the cavity member 116 by one ejector pin 140, so that the auxiliary material portion M is ejected from the movable mold 106. The other two ejector pins 140 collide with the flange section 76 molded in the recess 142, so as to eject the ferrule 70 out of the movable mold 106. At the same time, the ferrule 70 is cut at the opening end of the gate 182 from the auxiliary material portion M. In this manner, the ferrule 70 is completed.

In accordance with the manufacturing method as described above, even if some eccentricity in the uncoated-fiber holding bore 80 relative to the outer circumferential surface 88a of the inner tube part 88 is generated at the time of molding the inner tube part 88 in the primary mold 112, it is possible to reduce the eccentricity of the uncoated-fiber holding bore 80 relative to the center axis 74a, in the centering section 74 of the molded ferrule 70, to a required level (for example, 1 $\mu$m or less) and thus to obtain high dimensional precision, provided that the uncoated-fiber holding bore 80 of the inner tube part 88 is precisely positioned in the mold cavity 186 at the time of molding the outer tube part 86 in the secondary mold 114. Also, in the molding process of the outer tube part 86, a tubular wall 90 having generally uniform thickness is molded around the inner tube part 88 as previously molded, so that the molding shrinkage of resinous material in the outer tube part 86 occurs in a balanced state, and high dimensional precision (dimensional tolerance the outer diameter, cylindricity and circularity of the outer-circumferential centering reference surface 72, etc.) of the centering section 74 can be ensured. Further, by employing the two-color molding method, manufacturing cost can be significantly reduced compared to the ferrule 10 of the assembling type according to the first embodiment.

In particular, when the mold 100 having the rotational structure is used, molding processes can be performed simultaneously in the primary mold 112 and the secondary mold 114, so that the time required for producing one unit of product is not much different from that required in a mono-color molding process. Also, the construction wherein the core pin 138 is provided in the movable mold 106 and the distal end of the core pin 138 is fitted into the groove hole 146a provided on the bottom wall face of the recess 146 of the fixed mold 108 constituting the primary mold 112, makes it possible that the molded inner tube part 88 has no burr, that may obstruct the insertion of the uncoated optical fiber F, at the opening end of the uncoated-fiber holding bore 80 in the uncoated-fiber insertion side thereof.

Figure 25:
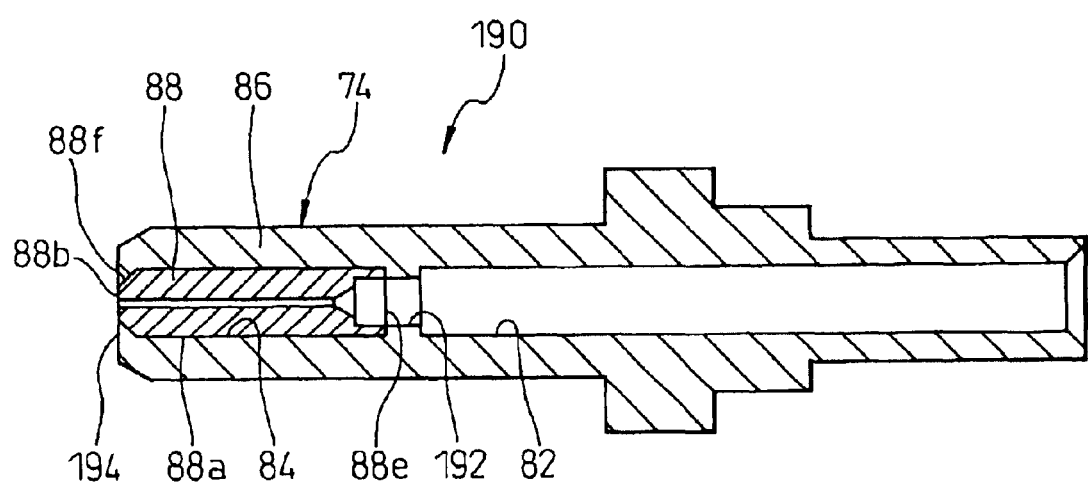
FIG. 25 is a sectional view of a modification of the ferrule.

In the ferrule 70 manufactured by the method as described above, it is a concern that, depending upon the resinous material used for the outer tube part 86 and the inner tube part 88, the inner tube part 88 may fall off from the outer tube part 86 after the molding process is completed. FIG. 25 shows a ferrule 190 according to a modification that can eliminate this concern. The ferrule 190 has substantially the same construction as the ferrule 70 shown in FIG. 10A, except that an engaging portion is provided in the outer tube part having the coated-fiber holding bore and the fixing bore, to prevent the inner tube part from being moved in an axial direction in the fixing bore. Therefore, corresponding components are denoted by the same reference numerals and the explanation thereof is omitted.

The ferrule 190 is provided in the coated-fiber holding bore 82 of the outer tube part 86 with an annular protrusion 192 for preventing the inner tube part 88 from being moved axially backward in the fixing bore 84. The inner tube part 88 is abutted at the axial end face 88e to the protrusion 192. Optionally, an annular protrusion 194 may be formed for preventing the inner tube part 88 from being moved in an axially forward direction in the fixing bore 84 by reducing the diameter of the fixing bore 84 locally at the opening end thereof.

The construction of the mold for forming the ferrule 190 having such construction will be described below with reference to FIGS. 26 and 27.

This mold is a modification of the mold 100 in which the construction of the movable core mechanism 120 of the movable mold 106 and the construction of the fixed mold 108 of the primary mold 112 are partially modified. Thus, the movable core mechanism 120 includes, in place of the above-described cylindrical core 144, an inner core 196 receiving the core pin 138 in an axially slidable manner and fixed to the cavity member 116, and an outer core 198 enclosing the inner core 196 and provided in an axially slidable manner relative to the inner core 196 and the cavity member 116. Further, the fixed mold 108 has, in the recess 146 of the cavity member 126, a tapered surface 146b extending between the circumferential wall surface and bottom wall surface.

Figure 26:
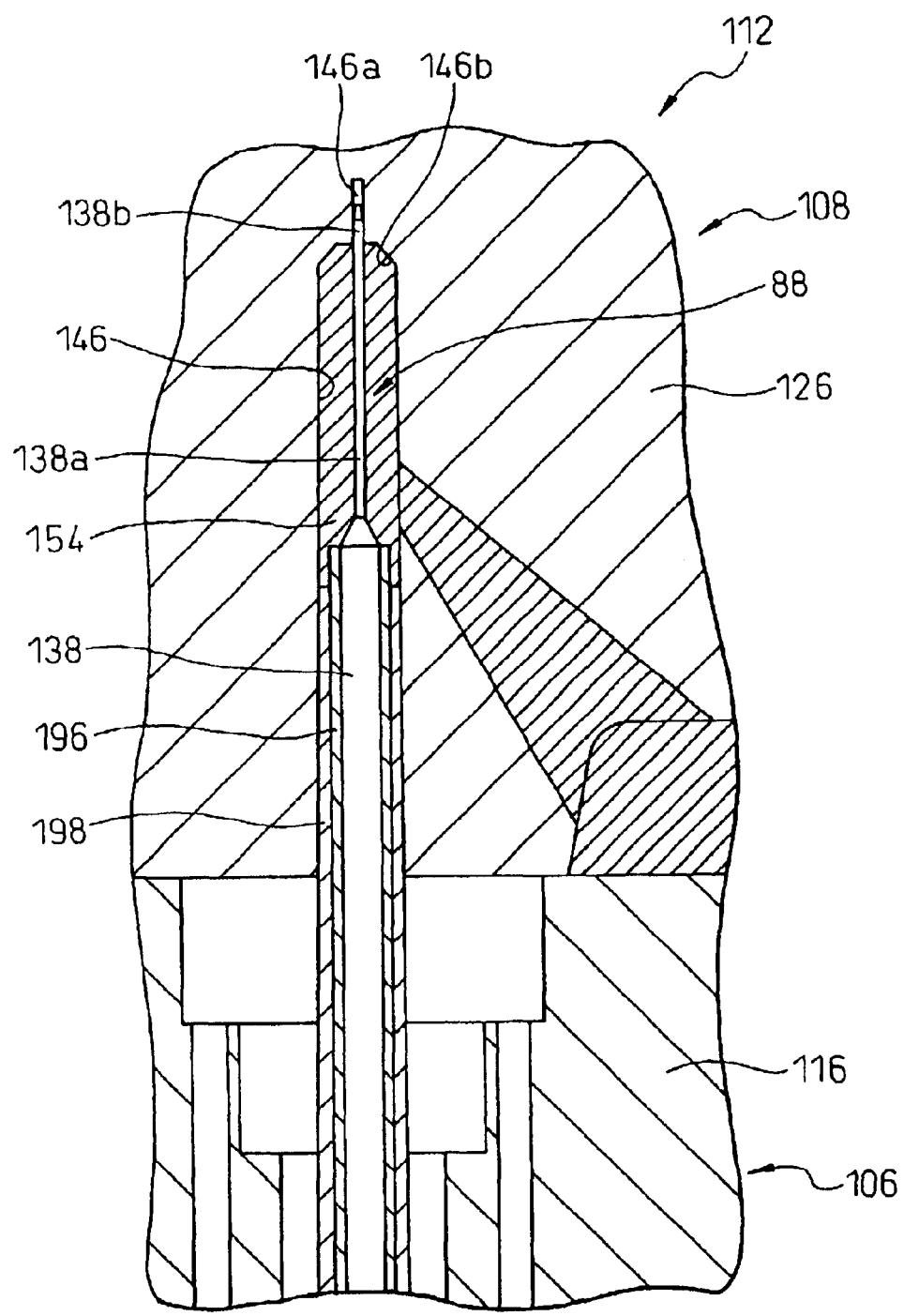
FIG. 26 shows, in a sectional view, a modification of the mold, for producing the ferrule as shown in FIG. 25, in the mold clamping state of the primary mold.
Figure 27:
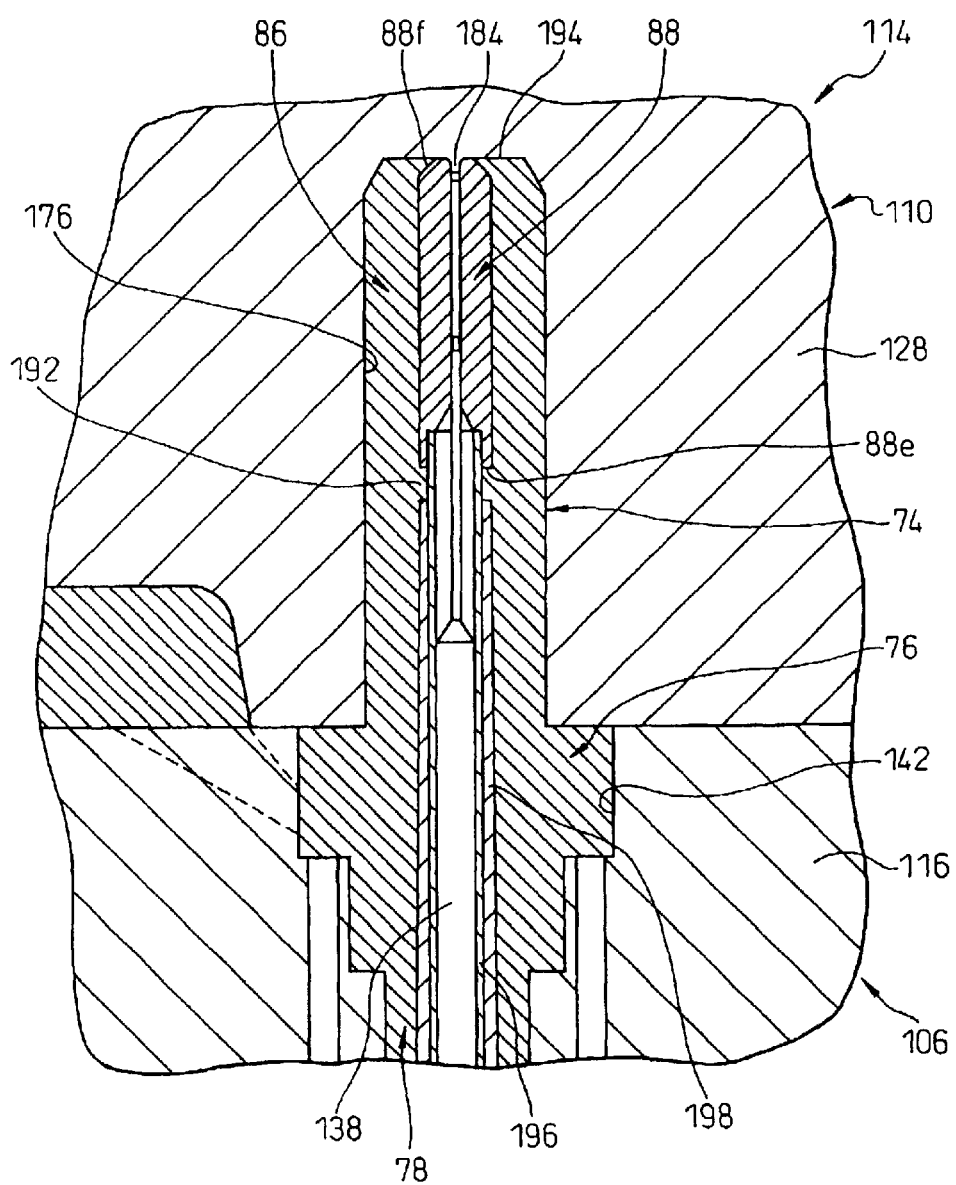
FIG. 27 shows, in a sectional view, the secondary mold of the mold shown in FIG. 26, in a mold clamping state.

When the primary mold 112 is in a mold clamping state as shown in FIG. 26, the inner core 196 and the outer core 198, constituting the cylindrical core of the movable mold 106, is received in the recess 146 of the fixed mold 108 in a liquid-tight manner, in a relative arrangement exhibiting substantially the same configuration as the cylindrical core 144 shown in FIG. 13. Similarly, the distal end 138b of the core pin 138 is fitted into the groove hole 146a provided on the bottom wall surface of the recess 146, and the small-diameter portion 138a of the core pin 138 is securely held in the predetermined position in the recess 146.

In this mold clamping state, a desired molten resinous material is supplied to the mold cavity 154 defined by the cooperation of the outer surfaces of the core pin 138, the inner core 196 and the outer core 198 with the inner surface of the recess 146, so that the inner tube part 88 is molded. On the inner tube part 88, a tapered surface 88f (FIG. 25) extending between the outer circumferential surface 88a and the axial end face 88b is formed correspondingly to the tapered surface 146b provided in the recess 146 of the fixed mold 108.

In the same way as in the above-described manufacturing process, the molded inner tube part 88 is transferred to the secondary mold 114. When the secondary mold 114 is in the mold clamping state shown in FIG. 27, the core pin 138 of the movable mold 106 is disposed in the same inoperative position as in FIG. 19. At the same time, the outer core 198 of the movable mold 106 is retracted by the drive mechanism (not shown) in an axially backward direction by a predetermined distance relative to the inner core 196. The inner tube part 88, supported by the core pin 138 and the inner core 196, is securely held in the predetermined position in the recess 176 while the positioning protrusion 184 provided on the bottom wall surface 176a of the recess 176 of the fixed mold 110 is fitted into the opening end of the uncoated-fiber holding bore 80.

In this mold clamping state, a desired molten resinous material is supplied to the mold cavity 186 defined by the outer surfaces of the inner tube part 88, the inner core 196 and the outer core 198 in cooperation with the inner surfaces of the recesses 176, 142, so that the outer tube part 86, the flange section 76 and the guide section 78 are molded, and the outer tube part 86 and the inner tube part 88 are integrally joined to form the centering section 74. In the ferrule 190 thus molded, the annular protrusion 192 (FIG. 25) is formed in the coated-fiber holding bore 82 of the outer tube part 86, corresponding to an annular cavity formed between the axial end face 88e of the inner tube part 88 and the axial end face of the outer core 198 by the retracting action of the outer core 198 in the secondary mold 114. The annular protrusion 194 (FIG. 25) is also formed at the opening end of the fixed bore 84, corresponding to the tapered surface 88f of the inner tube part 88.

Incidentally, in the ferrule 50 according to the second embodiment as described above (FIGS. 7 and 8), in contrast to the ferrules 10, 70 according to the first and the third embodiments, the entire centering section 54 is formed from a single material, so that, if the centering section of the counterpart ferrule is made of a hard material, it is a concern that the plastic deformation generating in the distal end face of the centering section 54 during the connected state kept in a long period. In this case, by applying the construction of the centering section having a composite structure as employed in the ferrules 10, 70 to the ferrule 50, the concern about the plastic deformation of the distal end face of the centering section can be eliminated.

Figure 28A:
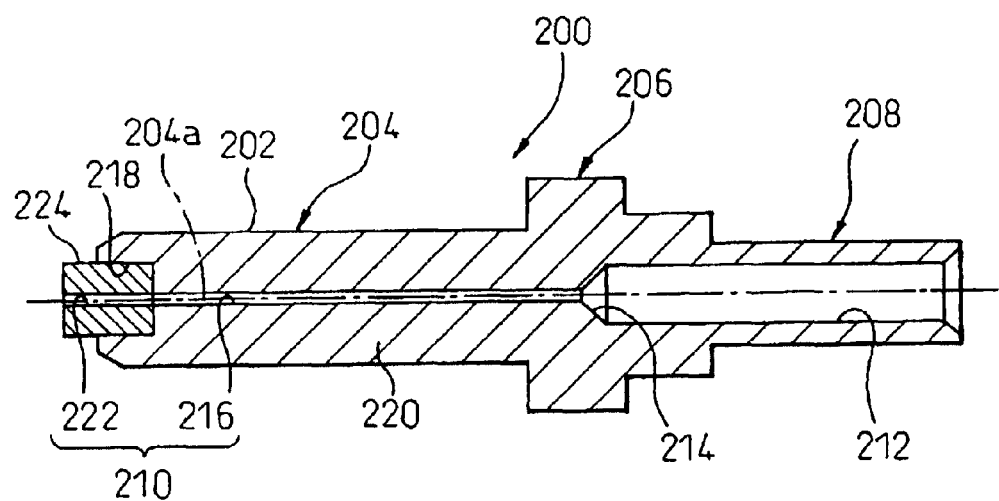
FIG. 28A is a sectional view of a plastic ferrule according to a fourth embodiment of the present invention.
Figure 28B:
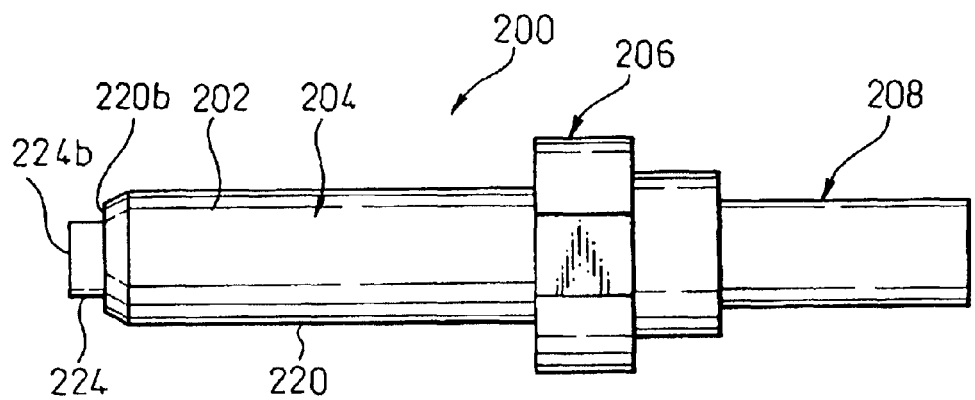
FIG. 28B is a front view of the plastic ferrule of FIG. 28A.

FIGS. 28A and 28B show a plastic ferrule 200 according to a fourth embodiment of the present invention employing the centering section of such a composite structure. The ferrule 200 includes a hollow tubular centering section 204 having a cylindrical outer circumferential surface 202, a flange section 206 provided adjacent to one axial end (that is, a proximal end) of the centering section 204 so as to project radially outwards, and a guide section 208 extending opposite to and concentric with the centering section 204 from the flange section 206.

The centering section 204 is provided, along the center axis 204a thereof (that is, the center axis of the cylindrical outer circumferential surface 202), with an uncoated-fiber holding bore 210 for securely accommodating an uncoated optical fiber F having its coating removed (FIG. 4). In the guide section 208, a coated-fiber holding bore 212, having a larger diameter than the uncoated-fiber holding bore 210, is formed for securely accommodating a coated optical fiber C with a coating (FIG. 4), concentrically along the extension line of the center axis 204a of the centering section 204. The uncoated-fiber holding bore 210 and the coated-fiber holding bore 212 are in axially straight communication with each other at the position corresponding to the flange section 206 via an annular tapered surface 214.

The outer circumferential surface 202 of the centering section 204 serves as a centering reference surface for the uncoated optical fiber F accommodated in the uncoated-fiber holding bore 210, at the time of the optical fiber connecting operation as described above with reference to FIG. 4. The outer-circumferential centering reference surface 202 is formed so as to extend in a straight line and have a uniform outer diametrical dimension, from the vicinity of another axial end (or a distal end) of the centering section 204 to the proximal end of the centering section adjacent to the flange section 206. As shown in FIG. 4, a split sleeve S of an optical connector is generally constructed so as to receive the centering section of the ferrule to be attached, not in its entire length extending up to the flange section, but in a predetermined axial length extending up to a position slightly spaced from the flange section. The predetermined axial length of the centering section, as to be received in the split sleeve S, is herein referred to as "an axial effective length".

The centering section 204 of the ferrule 200 includes a resinous outer tube part 220 which has an outer-circumferential centering reference surface 202, a first uncoated-fiber holding bore 216 forming a major length of an uncoated-fiber holding bore 210, and a fixing bore 218 extending from the first uncoated-fiber holding bore 216 along the center axis 204a while expanding in a radial direction, and an inner tube part 224 which has a second uncoated-fiber holding bore 222 forming the remaining length of the uncoated-fiber holding bore 210, the inner tube part 224 being fixed in the fixing bore 218 in a state where the second uncoated-fiber holding bore 222 aligned straightly with the first uncoated-fiber holding bore 216 of the outer tube part 220. In the illustrated embodiment, the outer tube part 220 and the inner tube part 224 are individually formed, as independent members, from materials of different hardness.

Figure 29:
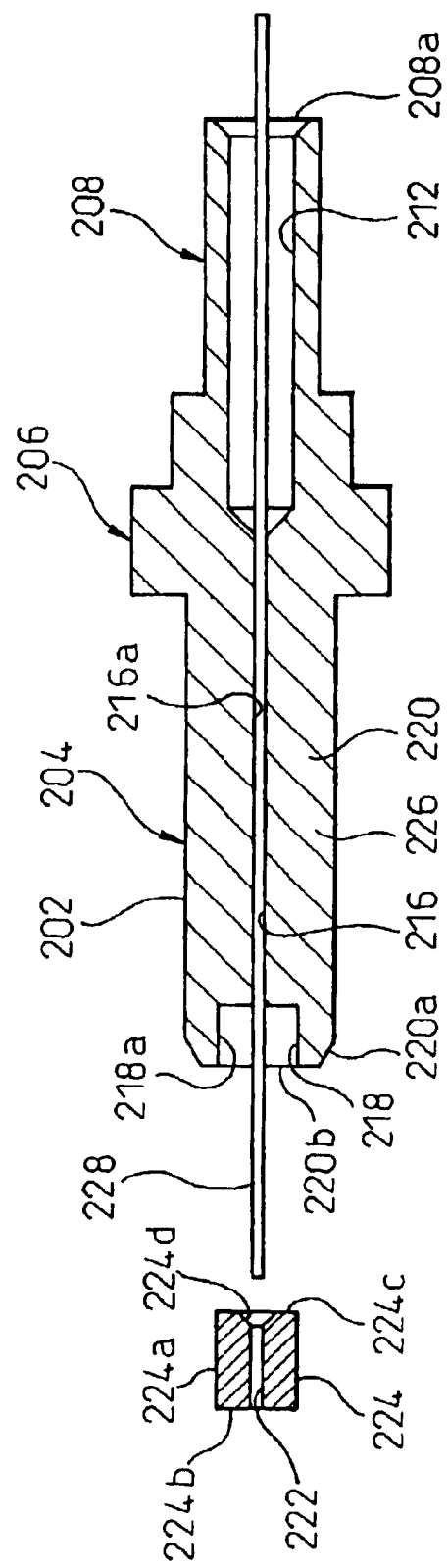
FIG. 29 shows, in a sectional view, an assembling process of the ferrule shown in FIG. 28A.

As shown in FIG. 29, the first uncoated-fiber holding bore 216 of the outer tube part 220 is provided adjacent to the coated-fiber holding bore 212 so as to extend over the major part of the axial effective length of the centering section 204, and the fixing bore 218 is provided over short range near the distal end of the centering section 204. The first uncoated-fiber holding bore 216 and the fixing bore 218 have cylindrical inner circumferential surfaces 216a and 218a, respectively, the substantial centers of which are aligned with the center axis 204a, and which are concentrically joined with each other and have uniform diametrical dimensions. The outer-circumferential centering reference surface 202 is joined at the distal end region of the outer tube part 220 via an annular tapered surface 220a to a generally flat distal end face 220b, to which the fixing bore 218 opens. A tubular wall 226 having generally uniform thickness as a whole is thereby formed in the outer tube part 220, over a major portion of the axial effective length, between the outer-circumferential centering reference surface 202 and the inner circumferential surface 216a. The coated-fiber holding bore 212 maintains a uniform inner diameter and linearly extends through the guide section 208 until it opens at the axial end face 208a of the guide section 208. The outer tube part 220 having such construction is molded integrally with the flange section 206 and the guide section 208 as a unitary body, from a desired resinous material such as liquid crystal polymers, for example, by an injection molding process.

As shown in FIG. 29, the inner tube part 224 has a cylindrical outer circumferential surface 224a capable of coming into close contact with the inner circumferential surface 218a of the fixing bore 218 of the outer tube part 220, and the second uncoated-fiber holding bore 222 is formed in a position substantially centered to the center axis of the outer circumferential surface 224a. The second uncoated-fiber holding bore 222 linearly extends and has a uniform diametrical dimension generally the same as the first uncoated-fiber holding bore 216 of the outer tube part 220, and opens at opposite axial end faces 224b, 224c of the inner tube part 224. In order to simplify the assembling process as described later, it is advantageous that the second uncoated-fiber holding bore 222 has an annular tapered surface 224d which expands gradually in a radial direction toward one axial end face 224c.

The inner tube part 224 having such construction is molded from material harder and preferably having larger elastic modulus than the resinous material of the outer tube part 220, such as metal, ceramics, etc. In particular, while considering a counterpart ferrule, prepared in a connecting process of optical fibers as described later, is formed of highly tough ceramic, such as zirconia ceramic generally used for a ferrule of an optical connector, it is advantageous that the material for the inner tube part 224 has mechanical properties (hardness, elastic modulus, toughness, etc.) at least comparable to zirconia ceramic.

The inner tube part 224 is oriented such that one axial end face 224c (or the end face on the side of the annular tapered surface 224d) is adjacent to the first uncoated-fiber holding bore 216 of the outer tube part 220, and is fitted into the fixing bore 218 of the outer tube part 220. In the illustrated embodiment, the inner tube part 224 is positioned in the fixing bore 218 in such a manner that the other axial end face 224b projects from the distal end face 220b of the outer tube part 220, in which the fixing bore 218 opens, by a predetermined length (FIG. 28B). Alternatively, the inner tube part 224 may be constructed with the same axial dimension as the axial dimension of the fixing bore 218, so that the axial end face 224b is exposed in generally the same plane as the distal end face 220b. The inner tube part 224 may be firmly fixed to the fixing bore 218 by pressing it into an interference fit state or using an adhesive. However, in order to align the centers of the first uncoated-fiber holding bore 216 and the second uncoated-fiber holding bore 222 in high precision, an adhesive is preferably used so as to cancel possible dimensional error in the outer tube part 220 and the inner tube part 224.

In the ferrule 200, the predetermined dimensional correlation is set between the axial effective length (L2) of the centering section 204 and the axial length (L1) of the uncoated-fiber holding bore 210 (i.e., L1=L2+α, wherein $0.5 \leq \alpha \leq 3.0$ (unit: mm)), in the same way as in the ferrule 50 according to the second embodiment as described before. In the illustrated embodiment, the axial effective length (L2) of the centering section 204 includes the length of a portion of the inner tube part 224 projecting from the distal end 220b of the outer tube part 220, and the axial length (L1) of the uncoated-fiber holding bore 210 is the sum of the lengths of the first uncoated-fiber holding bore 216 and the second uncoated-fiber holding bore 222.

In the ferrule 200 having the above construction, since the tubular wall 226 having a generally uniform thickness as a whole is provided to the centering section 204 over a major portion of axial effective length, high dimensional precision (the dimensional tolerance of outer diameter, cylindricity and circularity of the outer-circumferential centering reference surface 202, eccentricity of the first uncoated-fiber holding bore 216 relative to the center axis 204a, etc.) can be ensured over a major portion of the centering section 204, in the same way as in the ferrule 50 as described. Further, by fixing the inner tube part 224 to the fixing bore 218 of the outer tube part 220 under a relative positional correlation of high precision, high dimensional precision of the entire uncoated-fiber holding bore 210 including the second uncoated-fiber holding bore 222 can be ensured. Thus, the ferrule 200 can maintain the eccentricity of the uncoated-fiber holding bore 210 of the centering section 204 and the cylindricity and circularity of the outer-circumferential centering reference surface 222, which affect the connection loss of an optical fiber, at a high precision level of 0.1 to 1 $\mu$m order, applicable to a single mode optical fiber.

Also, in the ferrule 200, the inner tube part 224 of the centering section 204 is made of a hard material such as metal, ceramic, or the like. Therefore, during the connecting operation with the counterpart ferrule 30 shown in FIG. 4, even if a pressing force (usually in the order of several Newton) acts for a long period between the axial end face 224b of the inner tube part 224 and the distal end face 32a of the ceramic centering section 32, plastic deformation (or creep) of the inner tube part 224 can be reliably avoided. As a result, the connection loss in the optical fiber connecting structure can be reduced.

Figure 30:
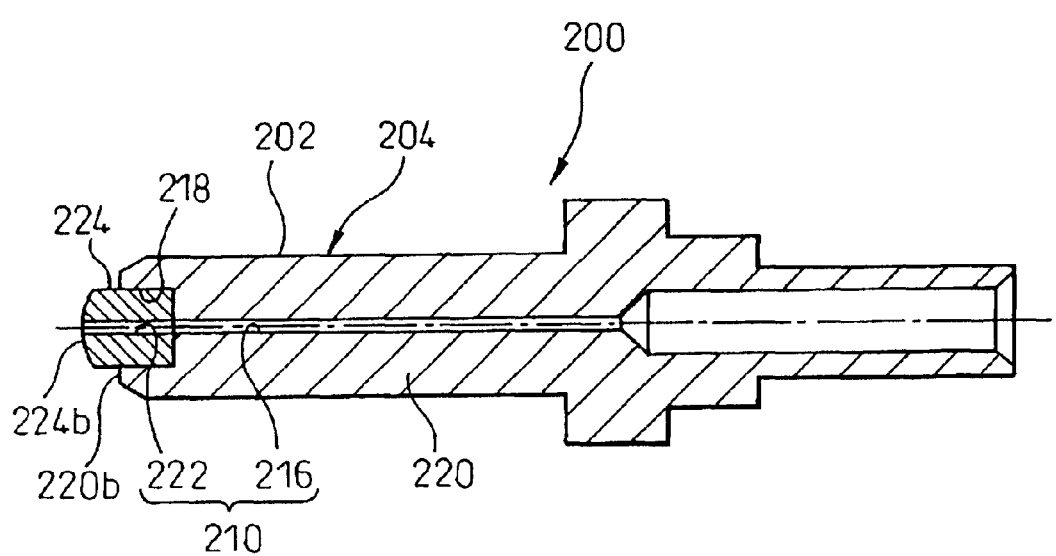
FIG. 30 is a sectional view of a modification of the ferrule.

In the above embodiment, it is advantageous to suitably spread an internal stress generating near the axial end face 224b of the inner tube part 224, during the period when the pressing force is loaded in the axial direction on the inner tube part 224 of the centering section 204 in the connecting condition with the counterpart ferrule 30, in order to reliably avoid plastic deformation of the inner tube part 224. FIG. 30 shows a modification of the ferrule 200, which includes the inner tube part 224 constructed for this purpose.

In the ferrule 200 according to the illustrated modification, the inner tube part 224 is formed such that the axial end face 224b projecting from the distal end face 220b of the outer tube part 220 has a spherically curved profile. Such a curved profile of the axial end face 224b serves to suitably spread the internal stress generated by the axial pressing force applied from the counterpart ferrule 30. In the ferrule 200, in particular, a desired curved profile can be given to the axial end face 224b of the inner tube part 224 by, e.g., an abrading process or the like, before the inner tube part 224 is assembled into the outer tube part 220.

In the ferrule 200 having above-described construction, an elongated guide jig 228 having an outer diametrical dimension slightly less than the inner diametrical dimension of the uncoated-fiber holding bore 210 may be used when the inner tube part 224 is assembled into the outer tube part 220 of the centering section 204. In this case, as shown in FIG. 29, the elongated guide jig 228 is inserted beforehand into the first uncoated-fiber holding bore 216 of the outer tube part 220, and is arranged such that an arbitrary length of the guide jig 228 projects outwards from the fixing bore 218. In this state, while the arbitrary length of the guide jig 228 is inserted via the annular tapered surface 224d of the inner tube part 224 into the second uncoated-fiber holding bore 222, the inner tube part 224 is fitted into the fixing bore 218 and is fixed to the latter. The inner tube part 224 is thereby accurately positioned in the fixing bore 218, and the second uncoated-fiber holding bore 222 and the first uncoated-fiber holding bore 216 are held in a state of being centered to each other in a high precision. When an adhesive (not shown) supplied between the fixing bore 218 of the outer tube part 220 and the inner tube part 224 has hardened, very high dimensional precision of the centering section 204 is ensured.

As is apparent from the foregoing description, in the plastic ferrule usable in an optical connector, according to the present invention, the centering section of the ferrule is constructed from an outer tube part having the outer-circumferential centering reference surface and a generally uniform thickness, and an inner tube part having the uncoated-fiber holding bore, so that a high level of dimensional precision for the centering section can be relatively easily ensured and relative eccentricity to the counterpart ferrule to be connected in a split sleeve can be reduced as much as possible. Even if the centering section of the counterpart ferrule is formed of a hard material, possible plastic deformation of the end face of the centering section during connection can be avoided and the optical connection loss can be thereby effectively reduced.

While the invention has been shown and described particularly with reference to preferred embodiments thereof, it will be understood by those skilled in the art that various changes and modifications may be made without departing from the spirit and scope of the following claims.

What is claimed is:

1. A plastic ferrule comprising:
   a centering section having a tubular body with an outer-circumferential centering reference surface and a center axis of said centering reference surface;
   said centering section comprising:
   a resinous outer tube part having said outer-circumferential centering reference surface and provided, along said center axis, with a coated-fiber holding bore for securely accommodating a coated optical fiber and a fixing bore extending from said coated-fiber holding bore, said outer tube part forming a tubular wall with a generally uniform thickness as a whole; and
   an inner tube part formed from a resinous material identical to said resinous outer tube part, said inner tube part being fixed to said fixing bore of said outer tube part and provided along said center axis with an uncoated-fiber holding bore, communicating with said coated-fiber holding bore, for securely accommodating an uncoated optical fiber.

2. A plastic ferrule as set forth in claim 1, wherein said outer tube part includes an engaging portion engaged with said inner tube part to prevent said inner tube part from being moved axially in said fixing bore.

3. A plastic ferrule as set forth in claim 2, wherein said engaging portion includes a protrusion provided in said coated-fiber holding bore, and wherein said inner tube part is abutted to said protrusion at an axial end face facing toward said coated-fiber holding bore.

4. A plastic ferrule comprising:
   a centering section having a tubular body with an outer-circumferential centering reference surface and a center axis of said centering reference surface;
   said centering section comprising:
   a resinous outer tube part having said outer-circumferential centering reference surface and provided, along said center axis, with a coated-fiber holding bore for securely accommodating a coated optical fiber and a fixing bore extending from said coated-fiber holding bore, said outer tube part forming a tubular wall with a generally uniform thickness as a whole; and
   an inner tube part formed fixed to said fixing bore of said outer tube part and provided along said center axis with an uncoated-fiber holding bore, communicating with said coated-fiber holding bore, for securely accommodating an uncoated optical fiber, wherein;
   said inner tube part includes an axial end face facing away from said coated-fiber holding bore of said outer tube part and exposed outside of said fixing bore of said outer tube part, and
   said axial end face of said inner tube part has a spherically curved profile and is located at a position projecting outwardly from said fixing bore of said outer tube part.

5. A method for producing a plastic ferrule having:
   a centering section having a tubular body with an outer-circumferential centering reference surface and a center axis of said centering reference surface, said centering section comprising:
   a resinous outer tube cart having said outer-circumferential centering reference surface and provided, along said center axis, with a coated-fiber holding bore for securely accommodating a coated optical fiber and a fixing bore extending from said coated-fiber holding bore, said outer tube part forming a tubular wall with a generally uniform thickness as a whole; and an inner tube part fixed to said fixing bore of said outer tube part and provided along said center axis with an uncoated-fiber holding bore, communicating with said coated-fiber holding bore, for securely accommodating an uncoated optical fiber, wherein said fixing bore of said outer tube part includes a cylindrical inner-circumferential surface, and wherein said inner tube cart includes a cylindrical outer-circumferential surface in close contact with said inner-circumferential surface of said fixing bore, the method comprising:

providing said inner tube part and said outer tube part as separate members independent from each other;

fitting said inner tube part into said fixing bore of said outer tube part;

rotating said inner tube part about said center axis in a condition where said outer-circumferential surface of said inner tube part is in close contact with said inner-circumferential surface of said outer tube part, and thereby adjusting a relative positional deviation between said center axis of said outer-circumferential centering reference surface and said uncoated-fiber holding bore; and fixing said inner tube part to said outer tube part at an angular position at which said relative positional deviation is minimized.

6. A plastic ferrule comprising:

a centering section having a tubular body with an outer-circumferential centering reference surface and a center axis of said centering reference surface, said centering section being provided along said center axis with an uncoated-fiber holding bore for securely accommodating an uncoated optical fiber;

wherein an axial length L1 (mm) of said uncoated-fiber holding bore and an axial effective length L2 (mm) of said centering section are selected to satisfy a formula L1=L2 $\alpha$, in which 0.5 (mm)$\leq \alpha \leq$3.0 (mm).

7. A plastic ferrule as set forth in claim 6, wherein said centering section comprises:

a resinous outer tube part having said outer-circumferential centering reference surface and provided, along said center axis, with a first bore portion defining a major length of said uncoated-fiber holding bore and a fixing bore extending from said first bore portion in a radially expanding profile to open at an axial end face of said centering section; and an inner tube part provided along said center axis with a second bore portion defining a remaining length of said uncoated-fiber holding bore, said inner tube part being fixed to said fixing bore of said outer tube part in a condition where said second bore portion is linearly aligned with said first bore portion of said outer tube part.

8. A plastic ferrule as set forth in claim 7, wherein said inner tube part is formed from a material having a hardness higher than a hardness of said outer tube part.

9. A plastic ferrule as set forth in claim 7, wherein said inner tube part includes an axial end face facing away from said first bore portion of said outer tube part and located at a position projecting outwardly from said fixing bore of said outer tube part.

10. A plastic ferrule as set forth in claim 9, wherein said axial end face of said inner tube part has a spherically curved profile.

11. A method for producing a plastic ferrule, said plastic ferrule being as set forth in claim 7 the method comprising:

providing said inner tube part and said outer tube part as separate members independent from each other;

providing a guide pin having an outer diameter slightly smaller than an inner diameter of said uncoated-fiber holding bore;

inserting said guide pin into said first bore portion of said outer tube part to dispose a certain length of said guide pin inside said fixing bore;

fitting said inner tube part into said fixing bore of said outer tube part, while receiving said certain length of said guide pin, disposed inside said fixing bore, into said second bore portion of said inner tube part; and fixing said inner tube part to said fixing bore of said outer tube part and removing said guide pin from said uncoated-fiber holding bore.

12. A method for producing a plastic ferrule, said plastic ferrule comprising a tubular centering section having an outer-circumferential centering reference surface and a center axis thereof; said centering section being provided, along said center axis, with an uncoated-fiber holding bore for securely accommodating an uncoated optical fiber and a coated-fiber holding bore, communicating with said uncoated-fiber holding bore, for securely accommodating a coated optical fiber; the method comprising:

providing a mold including a first cavity for molding an inner tube part, said inner tube part including said uncoated-fiber holding bore and an outer circumferential surface presenting a cross-sectional profile generally identical to a cross-sectional profile of said coated-fiber holding bore, and a second cavity for molding an outer tube part, said outer tube part including said outer-circumferential centering reference surface and said coated-fiber holding bore;

molding said inner tube part in said first cavity of said mold from a molten resinous material;

taking said inner tube part, as molded, from said first cavity and locating said inner tube part in said second cavity of said mold; and supplying a molten resinous material around said outer circumferential surface of said inner tube part and molding said outer tube part in said second cavity.

13. A method as set forth in claim 12, wherein the step of providing said mold includes further providing a tubular core for forming said coated-fiber holding bore of said outer tube part, said tubular core capable of being alternately arranged in said first cavity and said second cavity in an immovable manner, and a core pin for forming said uncoated-fiber holding bore of said inner tube part, said core pin capable of being alternately arranged in said first cavity and said second cavity in an axially movable manner relative to said tubular core;

wherein the step of molding said inner tube part includes engaging said core pin with a wall defining said first cavity to securely retain said core pin in said first cavity;

wherein the step of locating said inner tube part in said second cavity includes maintaining a condition where said tubular core and said core pin carry said inner tube part; and wherein the step of molding said outer tube part includes axially moving said core pin relative to said tubular core to partially open said uncoated-fiber holding bore of said inner tube part, and engaging said uncoated-fiber holding bore, as partially opened, with a wall defining said second cavity to securely retain said inner tube part in said second cavity.

14. A mold for producing a plastic ferrule, said plastic ferrule comprising a tubular centering section having an outer-circumferential centering reference surface and a center axis thereof; said centering section being provided, along said center axis, with an uncoated-fiber holding bore for securely accommodating an uncoated optical fiber and a coated-fiber holding bore, communicating with said uncoated-fiber holding bore, for securely accommodating a coated optical fiber; the mold comprising:

a first fixed mold;

a second fixed mold having a structure different from said first fixed mold; and a movable mold arranged in a movable manner relative to said first fixed mold and said second fixed mold and capable of being alternately assembled with said first fixed mold and said second fixed mold;

wherein said movable mold cooperates with said first fixed mold to define a first cavity for molding an inner tube part, said inner tube part including said uncoated-fiber holding bore and an outer circumferential surface presenting a cross-sectional profile generally identical to a cross-sectional profile of said coated-fiber holding bore, and cooperates with said second fixed mold to define a second cavity for molding an outer tube part around said inner tube part, as molded in said first cavity, in a condition where said inner tube part is located in said second cavity, said outer tube part including said outer-circumferential centering reference surface and said coated-fiber holding bore.

15. A mold as set forth in claim 14, wherein said movable mold comprises a tubular core for forming said coated-fiber holding bore of said outer tube part, said tubular core capable of being alternately arranged in said first cavity and said second cavity in an immovable manner, and a core pin for forming said uncoated-fiber holding bore of said inner tube part, said core pin capable of being alternately arranged in said first cavity and said second cavity in an axially movable manner relative to said tubular core;

wherein said first fixed mold is provided on a wall defining said first cavity with a groove capable of being engaged with said core pin to securely retain said core pin in said first cavity during a molding of said inner tube part;

wherein said core pin moves axially relative to said tubular core to partially open said uncoated-fiber holding bore of said inner tube part during molding of said outer tube part in said second cavity; and wherein said second movable mold is provided on a wall defining said second cavity with a projection capable of being engaged with said uncoated-fiber holding bore of said inner tube part to securely retain said inner tube part in said second cavity during molding of said outer tube part.

16. A mold as set forth in claim 14, wherein said movable mold comprises a pair of movable molds having mutually identical structures, said movable molds capable of being simultaneously assembled respectively with said first fixed mold and said second fixed mold, to mold said inner tube part in said first cavity and to mold, in a generally simultaneous manner, said outer tube part in said second cavity around another inner tube part, as previously molded in said first cavity, located in said second cavity.

* * * * *

UNITED STATES PATENT AND TRADEMARK OFFICE
CERTIFICATE OF CORRECTION

PATENT NO. : 6,877,910 B2  Page 1 of 1
DATED : April 12, 2005
INVENTOR(S) : Eietsu Takahashi et al.

It is certified that error appears in the above-identified patent and that said Letters Patent is hereby corrected as shown below:

Column 26,
Line 62, change "cart" to -- part --.

Column 27,
Line 11, change "cart" to -- part --.
Line 40, change "L1=L2 α" to -- L1=L2+α --.

Column 28,
Line 2, after "7" insert -- , --.

Signed and Sealed this

Twenty-seventh Day of December, 2005

JON W. DUDAS
*Director of the United States Patent and Trademark Office*